(12) United States Patent
Capelli et al.

(10) Patent No.: US 12,508,043 B2
(45) Date of Patent: Dec. 30, 2025

(54) RAPID PULSE ELECTROHYDRAULIC (EH) SHOCKWAVE GENERATOR APPARATUS WITH IMPROVED ACOUSTIC WAVEFRONTS

(71) Applicant: Soliton, Inc., Houston, TX (US)

(72) Inventors: Christopher C. Capelli, Houston, TX (US); Jeremiah Palmer, Houston, TX (US); Ali Shajii, Houston, TX (US); Daniel Masse, Houston, TX (US); Walter Klemp, Houston, TX (US); David Robertson, Houston, TX (US); Robert Crowley, Houston, TX (US)

(73) Assignee: Soliton, Inc., Houston, TX (US)

( * ) Notice: Subject to any disclaimer, the term of this patent is extended or adjusted under 35 U.S.C. 154(b) by 811 days.

(21) Appl. No.: 16/478,611

(22) PCT Filed: Jan. 17, 2018

(86) PCT No.: PCT/US2018/014053
§ 371 (c)(1),
(2) Date: Jul. 17, 2019

(87) PCT Pub. No.: WO2018/136514
PCT Pub. Date: Jul. 26, 2018

(65) Prior Publication Data
US 2020/0046391 A1 Feb. 13, 2020

Related U.S. Application Data

(60) Provisional application No. 62/447,191, filed on Jan. 17, 2017.

(51) Int. Cl.
*A61B 17/225* (2006.01)
*G10K 11/28* (2006.01)
*G10K 15/04* (2006.01)

(52) U.S. Cl.
CPC ............ *A61B 17/225* (2013.01); *G10K 11/28* (2013.01); *G10K 15/043* (2013.01)

(58) Field of Classification Search
CPC ........ A61B 17/225; A61B 2017/22024; G10K 11/28; G10K 11/352; G10K 15/043
See application file for complete search history.

(56) References Cited

U.S. PATENT DOCUMENTS

| 3,234,429 A | 2/1966 | Schrom |
| 3,364,708 A | 1/1968 | Padberg |

(Continued)

FOREIGN PATENT DOCUMENTS

| CN | 0008647 | 3/1980 |
| CN | 1245410 | 2/2000 |

(Continued)

OTHER PUBLICATIONS

Agneta M. Troilius, "Effective Treatment of Traumatic Tattoos With a Q-Switched Nd:YAG Laser," Dec. 7, 1998, Lasers Surg. Med., 22, pp. 103-108. (Year: 1998).*

(Continued)

*Primary Examiner* — Michael J Carey
*Assistant Examiner* — Maria Christina Talty
(74) *Attorney, Agent, or Firm* — Mintz, Levin, Cohn, Ferris, Glovsky and Popeo, P.C.

(57) ABSTRACT

Apparatuses and methods for generating therapeutic compressed acoustic waves (e.g., shock waves) with an improved acoustic wavefront. In the apparatuses, a housing is defined by a chamber and a shockwave outlet, the chamber is configured to be filed with liquid, a plurality of electrodes defining one or more spark gaps and an acoustic reflector can disposed in the chamber, and a pulse generation system configured to apply voltage pulses to the electrodes at a rate of between 10 Hz and 5 MHz. The improved (Continued)

acoustic wavefront is achieved via a free-form acoustic reflector and/or a stable spark gap location. The free-form acoustic reflector is designed according to a disclosed method including iterating reflector shape using spline interpolation based on defined variables. Additionally, a stable spark gap location is achieved via a single servomotor that adjusts both electrodes simultaneously.

23 Claims, 14 Drawing Sheets

(56) References Cited

U.S. PATENT DOCUMENTS

| | | |
|---|---|---|
| 3,475,646 A | 10/1969 | Chapman |
| 3,604,641 A | 9/1971 | Wilson et al. |
| 3,613,069 A | 10/1971 | Cary |
| 3,735,764 A | 5/1973 | Balev |
| 3,769,963 A | 11/1973 | Goldman et al. |
| 3,942,531 A | 3/1976 | Hoff |
| 3,983,749 A | 10/1976 | Fletcher et al. |
| 4,005,314 A | 1/1977 | Zinn |
| 4,311,147 A | 1/1982 | Hausler |
| 4,715,376 A | 12/1987 | Nowacki et al. |
| 4,858,597 A | 8/1989 | Kurtze et al. |
| 4,896,673 A | 1/1990 | Rose et al. |
| 4,905,671 A | 3/1990 | Senge et al. |
| 4,928,671 A | 5/1990 | Reichenberger et al. |
| 4,955,143 A * | 9/1990 | Hagelauer ............ A61B 17/225 33/645 |
| 4,962,752 A | 10/1990 | Reichenberger et al. |
| 4,979,501 A | 12/1990 | Valchanov et al. |
| 5,009,232 A | 4/1991 | Hassler et al. |
| 5,015,929 A | 5/1991 | Cathignol et al. |
| 5,071,422 A | 12/1991 | Watson et al. |
| 5,146,912 A | 9/1992 | Eizenhoefer |
| 5,149,406 A | 9/1992 | Mullen et al. |
| 5,150,713 A | 9/1992 | Okazaki |
| 5,152,767 A * | 10/1992 | Sypal ............... A61B 17/22022 606/128 |
| 5,193,527 A | 3/1993 | Schafer |
| 5,195,508 A | 3/1993 | Muller et al. |
| 5,204,820 A | 4/1993 | Strobel et al. |
| 5,231,976 A | 8/1993 | Wiksell |
| 5,240,005 A | 8/1993 | Viebach |
| 5,245,988 A | 9/1993 | Einars et al. |
| 5,259,368 A | 11/1993 | Wiksell |
| 5,269,292 A | 12/1993 | Granz et al. |
| 5,284,143 A | 2/1994 | Rattner |
| 5,304,170 A | 4/1994 | Green |
| 5,304,207 A | 4/1994 | Stromer |
| 5,327,890 A | 7/1994 | Matura et al. |
| 5,360,447 A | 11/1994 | Koop |
| 5,374,236 A | 12/1994 | Hassler |
| 5,393,296 A | 2/1995 | Rattner |
| 5,409,446 A | 4/1995 | Rattner |
| 5,419,327 A | 5/1995 | Rohwedder et al. |
| 5,423,803 A | 6/1995 | Tankovich et al. |
| 5,435,304 A | 7/1995 | Oppelt et al. |
| 5,458,652 A | 10/1995 | Uebelacker |
| 5,509,200 A | 4/1996 | Frankeny et al. |
| 5,529,572 A | 6/1996 | Spector |
| 5,595,178 A | 1/1997 | Voss et al. |
| 5,618,275 A | 4/1997 | Bock |
| 5,658,239 A | 8/1997 | Delmenico |
| 5,675,495 A | 10/1997 | Biermann et al. |
| 5,676,159 A | 10/1997 | Navis |
| 5,709,676 A | 1/1998 | Alt |
| 5,722,411 A | 3/1998 | Suzuki |
| 5,737,462 A | 4/1998 | Whitehouse et al. |
| 5,790,305 A | 8/1998 | Marcellin-Dibon et al. |
| 5,827,204 A | 10/1998 | Grandia et al. |
| 6,013,122 A | 1/2000 | Klitzman et al. |
| 6,036,661 A | 3/2000 | Schwarze et al. |
| 6,039,694 A | 3/2000 | Larson et al. |
| 6,058,932 A | 5/2000 | Hughes |
| 6,080,119 A | 6/2000 | Schwarze et al. |
| 6,096,029 A | 8/2000 | O'Donnell, Jr. |
| 6,113,559 A | 9/2000 | Klopotek |
| 6,113,560 A | 9/2000 | Simnacher |
| 6,123,679 A | 9/2000 | Lafaut et al. |
| 6,176,839 B1 | 1/2001 | Deluis et al. |
| 6,186,963 B1 | 2/2001 | Schwarze et al. |
| 6,210,329 B1 | 4/2001 | Christmas et al. |
| 6,217,531 B1 * | 4/2001 | Reitmajer ............ G10K 15/06 601/4 |
| 6,309,355 B1 | 10/2001 | Cain et al. |
| 6,325,769 B1 | 12/2001 | Klopotek |
| 6,350,245 B1 | 2/2002 | Cimino |
| 6,368,929 B1 | 4/2002 | Hill et al. |
| 6,390,995 B1 | 5/2002 | Ogden et al. |
| 6,450,979 B1 | 9/2002 | Miwa et al. |
| 6,454,713 B1 | 9/2002 | Ishibashi et al. |
| 6,487,447 B1 | 11/2002 | Weimann et al. |
| 6,491,685 B2 | 12/2002 | Visuri |
| 6,500,141 B1 | 12/2002 | Irion et al. |
| 6,515,842 B1 | 2/2003 | Hayworth et al. |
| 6,519,376 B2 | 2/2003 | Biagi et al. |
| 6,551,308 B1 | 4/2003 | Muller et al. |
| 6,666,834 B2 | 12/2003 | Restle et al. |
| 6,755,821 B1 | 6/2004 | Fry |
| 6,800,122 B2 | 10/2004 | Anderson et al. |
| 6,905,467 B2 | 6/2005 | Bradley |
| 6,942,663 B2 | 9/2005 | Vargas et al. |
| 6,948,843 B2 | 9/2005 | Laugharn et al. |
| 6,972,116 B2 | 12/2005 | Brill et al. |
| 7,189,209 B1 | 3/2007 | Ogden et al. |
| 7,250,047 B2 | 7/2007 | Anderson et al. |
| 7,311,678 B2 | 12/2007 | Spector |
| 7,364,554 B2 | 4/2008 | Bolze et al. |
| 7,405,510 B2 | 7/2008 | Kaminski et al. |
| 7,470,240 B2 | 12/2008 | Schultheiss et al. |
| 7,507,213 B2 | 3/2009 | Schultheiss et al. |
| 7,544,171 B2 | 6/2009 | Schaden et al. |
| 7,588,547 B2 | 9/2009 | Deem et al. |
| 7,867,178 B2 | 1/2011 | Simnacher |
| 7,985,189 B1 | 7/2011 | Ogden et al. |
| 7,988,631 B2 | 8/2011 | Bohris |
| 8,057,408 B2 | 11/2011 | Cain et al. |
| 8,088,073 B2 | 1/2012 | Simnacher et al. |
| 8,092,401 B2 | 1/2012 | Schultheiss |
| 8,102,734 B2 | 1/2012 | Sliwa et al. |
| 8,235,899 B2 | 8/2012 | Hashiba |
| 8,257,282 B2 | 9/2012 | Uebelacker et al. |
| 8,298,162 B2 | 10/2012 | Del Giglio |
| 8,323,220 B2 | 12/2012 | Babaev |
| 8,343,420 B2 | 1/2013 | Cioanta et al. |
| 8,357,095 B2 | 1/2013 | Anderson et al. |
| 8,672,721 B2 | 3/2014 | Camilli |
| 8,684,970 B1 | 4/2014 | Koyfman |
| 2001/0023326 A1 | 9/2001 | Spector |
| 2002/0009015 A1 | 1/2002 | Laugharn et al. |
| 2002/0193831 A1 | 12/2002 | Smith |
| 2003/0167964 A1 | 9/2003 | Anderson et al. |
| 2003/0233045 A1 | 12/2003 | Vaezy |
| 2004/0006288 A1 | 1/2004 | Spector et al. |
| 2004/0181219 A1 | 9/2004 | Goble et al. |
| 2005/0015023 A1 | 1/2005 | Ein-Gal |
| 2005/0049543 A1 | 3/2005 | Anderson et al. |
| 2005/0150830 A1 | 7/2005 | Laugharn et al. |
| 2006/0036168 A1 * | 2/2006 | Liang .................... G10K 15/06 600/437 |
| 2006/0064082 A1 | 3/2006 | Bonutti |
| 2006/0094988 A1 | 5/2006 | Tosaya et al. |
| 2006/0158956 A1 | 7/2006 | Laugharn et al. |
| 2006/0173388 A1 | 8/2006 | Ginter et al. |
| 2006/0184071 A1 | 8/2006 | Klopotek |
| 2006/0200116 A1 | 9/2006 | Ferren et al. |
| 2006/0211958 A1 | 9/2006 | Rosenberg et al. |
| 2007/0016112 A1 * | 1/2007 | Schultheiss ...... A61B 17/22004 601/4 |
| 2007/0038060 A1 | 2/2007 | Cerwin et al. |
| 2007/0049829 A1 | 3/2007 | Kaminski et al. |

(56) References Cited

U.S. PATENT DOCUMENTS

| | | |
|---|---|---|
| 2007/0055157 A1 | 3/2007 | Bohris |
| 2007/0055180 A1 | 3/2007 | Deem et al. |
| 2007/0065420 A1 | 3/2007 | Johnson |
| 2007/0135755 A1 | 6/2007 | Bernabei et al. |
| 2007/0198068 A1 | 8/2007 | Chan et al. |
| 2007/0219760 A1 | 9/2007 | Yang et al. |
| 2007/0239072 A1 | 10/2007 | Schultheiss |
| 2007/0239082 A1 | 10/2007 | Schultheiss et al. |
| 2007/0239084 A1 | 10/2007 | Voss |
| 2007/0249939 A1 | 10/2007 | Gerbi et al. |
| 2008/0009774 A1 | 1/2008 | Capelli et al. |
| 2008/0009885 A1 | 1/2008 | Del Giglio |
| 2008/0021447 A1 | 1/2008 | Davison et al. |
| 2008/0071198 A1 | 3/2008 | Ogden et al. |
| 2008/0107744 A1 | 5/2008 | Chu |
| 2008/0132810 A1 | 6/2008 | Scoseria et al. |
| 2008/0146971 A1 | 6/2008 | Uebelacker et al. |
| 2008/0154157 A1 | 6/2008 | Altshuler et al. |
| 2008/0183200 A1 | 7/2008 | Babaev |
| 2008/0194967 A1 | 8/2008 | Sliwa et al. |
| 2008/0195003 A1 | 8/2008 | Sliwa et al. |
| 2008/0262483 A1 | 10/2008 | Capelli et al. |
| 2008/0269163 A1 | 10/2008 | Sostaric |
| 2008/0269608 A1 | 10/2008 | Anderson et al. |
| 2008/0319356 A1 | 12/2008 | Cain et al. |
| 2009/0018472 A1 | 1/2009 | Soltani et al. |
| 2009/0043300 A1* | 2/2009 | Reitmajer .............. G10K 15/06 606/41 |
| 2009/0062644 A1 | 3/2009 | McMorrow et al. |
| 2009/0275832 A1 | 11/2009 | Gelbart et al. |
| 2010/0049098 A1 | 2/2010 | Shalgi et al. |
| 2010/0076349 A1 | 3/2010 | Babaev |
| 2010/0082019 A1 | 4/2010 | Neev |
| 2010/0087899 A1 | 4/2010 | Erez et al. |
| 2010/0168575 A1 | 7/2010 | Hashiba |
| 2010/0204617 A1 | 8/2010 | Ben-Ezra |
| 2010/0208467 A1 | 8/2010 | Dross |
| 2010/0249768 A1 | 9/2010 | Avramenko et al. |
| 2010/0274161 A1 | 10/2010 | Alzhari et al. |
| 2010/0280420 A1 | 11/2010 | Barthe et al. |
| 2010/0331741 A9 | 12/2010 | Cioanta et al. |
| 2011/0034832 A1 | 2/2011 | Cioanta et al. |
| 2011/0087157 A1 | 4/2011 | Cioanta et al. |
| 2011/0319793 A1 | 12/2011 | Hynynen |
| 2012/0157892 A1 | 6/2012 | Reitmajer et al. |
| 2012/0167174 A1 | 6/2012 | Saxena et al. |
| 2012/0253240 A1 | 10/2012 | Uebelacker et al. |
| 2012/0253416 A1 | 10/2012 | Erez et al. |
| 2012/0271169 A1 | 10/2012 | Coussios et al. |
| 2012/0310232 A1 | 12/2012 | Erez |
| 2012/0323147 A1 | 12/2012 | Scheirer |
| 2012/0330288 A1 | 12/2012 | Clementi et al. |
| 2013/0018287 A1 | 1/2013 | Capelli |
| 2013/0046179 A1 | 2/2013 | Humayun |
| 2013/0046207 A1 | 2/2013 | Capelli |
| 2013/0345600 A1* | 12/2013 | Katragadda .......... A61B 17/225 601/4 |
| 2014/0005576 A1 | 1/2014 | Adams et al. |
| 2014/0094718 A1 | 4/2014 | Feldman |
| 2014/0228820 A1 | 8/2014 | Blaskowski et al. |
| 2014/0243715 A1 | 8/2014 | Cioanta et al. |
| 2014/0243847 A1* | 8/2014 | Hakala .................. A61B 17/22 606/128 |
| 2014/0257144 A1 | 9/2014 | Capelli et al. |
| 2014/0276693 A1 | 9/2014 | Altshuler et al. |
| 2014/0276722 A1 | 9/2014 | Parihar et al. |
| 2014/0277219 A1 | 9/2014 | Nanda |
| 2014/0378740 A1 | 12/2014 | Wagner et al. |
| 2015/0105702 A1 | 4/2015 | Wagner et al. |
| 2015/0126913 A1 | 5/2015 | Jurna et al. |
| 2015/0217111 A1 | 8/2015 | Stevenson et al. |
| 2015/0224345 A1* | 8/2015 | Warlick ................ A61N 7/00 601/2 |
| 2015/0359557 A1* | 12/2015 | Shimokawa ............. G02B 6/36 601/2 |
| 2016/0016013 A1 | 1/2016 | Capelli et al. |
| 2016/0067139 A1 | 3/2016 | Katragadda et al. |
| 2016/0166837 A1 | 6/2016 | Strommer et al. |
| 2016/0262778 A1 | 9/2016 | Du |
| 2016/0271419 A1 | 9/2016 | Varghese et al. |
| 2017/0202514 A1 | 7/2017 | Nousiainen et al. |
| 2017/0301474 A1 | 10/2017 | Saito |
| 2018/0078774 A1 | 3/2018 | Strommer et al. |
| 2018/0116905 A1 | 5/2018 | Capelli et al. |
| 2018/0221688 A1 | 8/2018 | Cioanta et al. |
| 2020/0206072 A1 | 7/2020 | Capelli et al. |
| 2020/0222068 A1 | 7/2020 | Capelli et al. |
| 2020/0238100 A1 | 7/2020 | Capelli et al. |
| 2022/0218562 A1 | 7/2022 | Capelli et al. |

FOREIGN PATENT DOCUMENTS

| | | |
|---|---|---|
| CN | 101028525 | 9/2007 |
| CN | 101146574 | 3/2008 |
| CN | 101155614 | 4/2008 |
| CN | 100530868 | 8/2009 |
| CN | 101610736 | 12/2009 |
| CN | 102057422 | 5/2011 |
| CN | 102247661 | 11/2011 |
| CN | 105209117 | 12/2015 |
| CN | 105246419 | 1/2016 |
| DE | 3150430 | 7/1983 |
| DE | 3710371 | 10/1988 |
| DE | 60008898 | 1/2005 |
| DE | 102007406902 | 4/2009 |
| EP | 0243650 | 11/1987 |
| EP | 0322473 | 7/1989 |
| EP | 0326620 | 8/1989 |
| EP | 2964326 | 1/2016 |
| EP | 3626307 | 3/2020 |
| FR | 2605874 | 5/1988 |
| GB | 2303552 | 2/1997 |
| JP | 53-111689 | 9/1978 |
| JP | S 61-293447 | 12/1986 |
| JP | 62-192150 | 8/1987 |
| JP | S 63-023775 | 2/1988 |
| JP | S 63-183050 | 7/1988 |
| JP | H03-67428 B2 | 10/1991 |
| JP | H 0 6-7365 | 1/1994 |
| JP | H06-119805 A | 4/1994 |
| JP | H 06-505648 | 6/1994 |
| JP | 6-73654 | 10/1994 |
| JP | 8-140984 | 6/1996 |
| JP | H 08140984 | 6/1996 |
| JP | 8-194079 | 7/1996 |
| JP | 1996-222472 | 8/1996 |
| JP | H0-8224253 | 9/1996 |
| JP | H09-75467 A | 3/1997 |
| JP | 9-103434 | 4/1997 |
| JP | H09103434 | 4/1997 |
| JP | H 10192289 | 7/1998 |
| JP | H 10328192 | 12/1998 |
| JP | 2000-173327 A | 6/2000 |
| JP | 2003-500126 | 1/2003 |
| JP | 2004526507 | 9/2004 |
| JP | 2005514142 | 5/2005 |
| JP | 2007-000218 | 1/2007 |
| JP | 2009-506870 | 2/2009 |
| JP | 2009-518126 | 4/2009 |
| JP | 2009-527262 | 7/2009 |
| JP | 2009-543614 | 12/2009 |
| JP | 2010-524591 A | 7/2010 |
| JP | 2010-170856 A | 8/2010 |
| JP | 2012-516170 | 7/2012 |
| JP | 2013-537559 | 10/2013 |
| JP | 2014-507990 | 4/2014 |
| JP | 2014-525782 | 10/2014 |
| JP | 2016/523602 | 8/2016 |
| JP | 2017-500078 | 1/2017 |
| JP | 61-73644 | 8/2017 |
| KR | 101886863 | 8/2018 |
| RU | 2121812 | 11/1998 |

(56) References Cited

FOREIGN PATENT DOCUMENTS

| RU | 2151559 | 6/2000 | | |
|---|---|---|---|---|
| TW | 200604017 | 2/2006 | | |
| TW | I 292341 | 1/2008 | | |
| TW | I 350249 | 10/2011 | | |
| WO | WO 91/10227 | 7/1991 | | |
| WO | WO 2000/071207 | 11/2000 | | |
| WO | WO-0124712 A1 * | 4/2001 | ....... | A61B 17/22004 |
| WO | WO 2002/030256 | 4/2002 | | |
| WO | WO 2004/080147 | 9/2004 | | |
| WO | WO 2007/067563 | 6/2007 | | |
| WO | WO 2007/088546 | 8/2007 | | |
| WO | WO 2007/146988 | 12/2007 | | |
| WO | WO 2008/052198 | 5/2008 | | |
| WO | WO 2008/074005 | 6/2008 | | |
| WO | WO 2008/137942 | 11/2008 | | |
| WO | WO 2010/086301 | 8/2010 | | |
| WO | WO 2010/122517 | 10/2010 | | |
| WO | WO 2011/077466 | 6/2011 | | |
| WO | WO 2011/091020 | 7/2011 | | |
| WO | WO 2012/107830 | 8/2012 | | |
| WO | WO 2013/012724 | 1/2013 | | |
| WO | WO 2014/138582 | 9/2014 | | |
| WO | WO 2014/191263 | 12/2014 | | |
| WO | WO 2015/176001 | 11/2015 | | |
| WO | WO-2016095876 A1 * | 6/2016 | | |
| WO | WO 2017/165595 | 9/2017 | | |
| WO | WO 2018/136514 | 7/2018 | | |

OTHER PUBLICATIONS

Ioannis Manousakas et al., "Development of a system of automatic gap-adjusted electrodes for shock wave generators," Nov. 2004, Review of Scientific Instruments, vol. 75, No. 11, pp. 4811-4819 (Year: 2004).*
Scott Carlberg et al., "Upgrading from Stepper to Servo," Nov. 30, 2011, Yaskawa, pp. 1-7 (Year: 2011).*
Sangouard translation.*
International Search Report and Written Opinion issued in Corresponding PCT Application No. PCT/US2020/026425, dated Sep. 2, 2020.
Office Action and Search Report issued in Corresponding Chinese Application No. 201780056472.0, dated Jan. 19, 2022 (English Translation provided).
Boxman, et al., "Handbook of Vacuum Arc Science and Technology: Fundamentals and Applications," Park Ridge, New Jersey: Noyes Publications, pp. 316-319, 1995.
Extended European Search Report Issued in Corresponding European Patent Application No. 20153807.1, dated Jun. 9, 2020.
International Preliminary Report on Patentability Issued in Corresponding PCT Application No. PCT/US2017/042122, issued Jan. 22, 2019.
International Search Report and Written Opinion Issued in Corresponding PCT Application No. PCT/US2017/042122, mailed Jan. 9, 2018.
International Search Report and Written Opinion Issued in Corresponding PCT Application No. PCT/US14/21746, mailed Sep. 12, 2014.
Office Action Issued in Corresponding Japanese Patent Application No. 2019-012062, dated Jun. 16, 2020.
Partial Supplementary Search Report Issued in Corresponding European Patent Application No. EP18754679.1, dated Jul. 29, 2020.
Schmitz, et al., "Treatment of Chronic Plantar Fasciopathy with Extracorporeal Shock Waves (Review)," Journal of Orthopaedic Surgery and Research, 8(1); 31, 2013.
Ushakov, et al., "Impulse Breakdown of Liquids," New York, New York: Springer. 2007.
Baumler et al., Q-Switch Laser and Tattoo Pigments: First Results of the Chemical and Photophysical Analysis of 41 Compounds, Lasers in Surgery and medicine 26:13-21 (2000), pp. 13-21.

Bickle, Abdominal X Rays Made Easy: Calcification, Student BMJ vol. 10, Aug. 2002, 272-274.
Burov, et al., "Nonlinear Ultrasound: Breakdown of Microscopic Biological Structures and Nonthermal Impact on Malignant Tumor," Doklady Biochemistry and Biophysics, 383(3), pp. 101-104. (2002).
Chen et al., "The disappearance of ultrasound contrast bubbles: Observations of bubble dissolution and Cavitation nucleation", Ultrasound in Med. & Biol., vol. 28, No. 6, pp. 793-803, 2002.
Delius, et al., "Biological Effects of Shock Waves: Kidney Haemorrhage by Shock Waves in Dogs—Administration Rate Dependence," Ultrasound Med Biol., 14(8), 689-694, 1988.
Eisenmenger, W. et al., "The First Clinical Results of Wide-Focus and Low-Pressure ESWL" Ultrasound in Med. & Biol., vol. 28, No. 6, pp. 769-774, 2002.
Eisenmenger, Wolfgang, "The Mechanisms of Stone Fragmentation in ESWL", Ultrasound in Med. & Biol., vol. 27, No. 5, pp. 683-693, 2001.
Falco, "Single-Point Nonlinearity Indicators for the Propagation of High Amplitude Acoustic Signals," Ph.D. Thesis. Graduate Program in Acoustics, The Pennsylvania State University, University Park, PA, May 2007.
Fernando, "A Nonlinear Computational Method for the Propagation of Shock Waves in Aero-Engine Inlets Towards A New Model for Buzz-Saw Noise Prediction," $15^{th}$ AIAA/CEAS Aeroacoustics Conference ($30^{th}$ Aeroacoustics Conference) May 11-13, 2009, 1-18.
Gillitzer, et al., "Low-Frequency Extracorporeal Shock Wave Lithotripsy Improves Renal Pelvic Stone Disintegration An A Pig Model," BJU Int, 176, 1284-1288, 2009.
Ho et al., "Laser-Tattoo Removal-A Study of the Mechanism and the Optimal Treatment Strategy via Computer Simulations", Lasers in Surgery and medicine 30:389-391 (2002).
International Search Report Issued in Corresponding PCT Patent Application No. PCT/US2018/014053, mailed May 4, 2018.
Kuhn et al., "Impact of extracorporeal shock waves on the human skin with cellulite: A case study of an unique instance", Clinical Interventions of Aging, 3(1):201-210, 2008.
Kuperman-Beade et al., "Laser Removal of Tattoos", Am J Clin Dermatol 2001: 2(1):21-25.
Kuzmin et al., "Ultrasonic Cavitational Chemical Technologies", XI Session of the Russian Acoustical Society, Moscow, Nov. 19-23, 2001.
Liu, et al., "Optimized Design of LED Freeform Lens For Uniform Circular Illumination," Journal of Zhejiang University—Science C, Computer & Electron, 13(12), 929-936, 2012.
Madbouly, et al., "Slow Versus Fast Shock Wave Lithotripsy Rate for Urolithiasis: A Prospective Randomized Study," The Journal of Urology, 173, 127-130, 2005.
Nana, et al., "Application of the Multiple Low-Energy Q-Switched Laser for the Treatment of Tattoos in 21 Cases," China Aesthetic Medicine, 4(21), 621-622, 2012. (English Abstract).
Ng et al., "Therapeutic Ultrasound: Its Application in Drug Delivery", Medicinal Research Reviews, vol. 22, No. 2, 204-223, 2002.
Ogden et al., Principles of Shock Wave Therapy, Clinical Orthopaedics and Related Research, No. 387, pp. 8-17, 2001.
Reichenberger, "Electromagnetic Acoustic Source for Extracorporeal Generation of Shock Waves in Lithotripsy," Siemens Forsch, 1986, 187-194.
Ross et al., "Comparison of Responses of Tattoos to Picosecond and Nanosecond Q-Switched Neodymium: YAG Lasers" ARCH Dermatol/ vol. 134, Feb. 1998, pp. 167-171.
Sheth and Pandya, "Melsama: A comprehensive update (Part I)", Journal of the American Academy of Dermatology, 65:689-697, 2011.
Sheth and Pandya, "Melsama: A comprehensive update (Part II)", Journal of the American Academy of Dermatology, 65:699-714, 2011.
Solis et al., "Experimental Nonsurgical Tattoo Removal in a Guinea Pig Model with Topical Imiquimod and Tretinoin", Dermatol Surg. 2002, 28:83-87.
Timko et al., "In Vitro Quantitative Chemical Analysis of Tattoo Pigments", ARCH Dermatol/vol. 137, Feb. 2001, pp. 143-147.

(56) References Cited

OTHER PUBLICATIONS

Varma, S., "Tattoo Ink Darkening of a Yellow Tattoo after Q-Switched Laser Treatment", 2002 Blackwell Science Ltd., Clinical and Experimental Dermatology, 27, 461-463.
Vogel, et al., "Shock Wave Emission and Cavitation Bubble Generation by Picosecond and Nanosecond Optical Breakdown in Water," J. Acoust. Soc. Am., 100 (1) Jul. 1996.
Wolfrum et al., "Shock wave induced interaction of microbubbles and boundaries", Physics of Fluids, vol. 15, No. 10, Oct. 2003, pp. 2916-2922.
Supplementary European Search Report Issued in European Patent Application No. 18742001.3, dated Oct. 2, 2020.
English translation of Office Action issued in Korean Patent Application No. 10-2019-7005043 dated Sep. 28, 2022.
Office Action issued in U.S. Appl. No. 16/087,976 dated Oct. 13, 2022.
Official Action issued in Japanese Patent Application No. 2019-544631, dated Sep. 16, 2022.
Official Action issued in U.S. Appl. No. 13/547,995, dated Sep. 15, 2022.
Official Action issued in U.S. Appl. No. 16/319,509, dated Sep. 20, 2022.
Official Action issued in U.S. Appl. No. 16/486,920, dated Sep. 14, 2022.
Office Action issued in Australian Patent Application No. 2021201670, dated Jun. 20, 2022.
Office Communication issued in U.S. Appl. No. 16/904,125, dated Mar. 23, 2023.
Office Communication issued in U.S. Appl. No. 17/096,932, dated Mar. 28, 2023.
English translation of Office Action issued in Japanese Patent Application No. 2021-184610, dated Nov. 18, 2022.
Office Action issued in Australian Patent Application No. 2018221251, dated Nov. 10, 2022.
Notice of Allowance issued in U.S. Appl. No. 17/648,790, dated Feb. 28, 2023.
Office Communication issued in Japanese Patent Application No. 2018-550349, dated Mar. 7, 2023. (English translation).
Office Communication issued in U.S. Appl. No. 16/319,509, dated Apr. 10, 2023.

\* cited by examiner

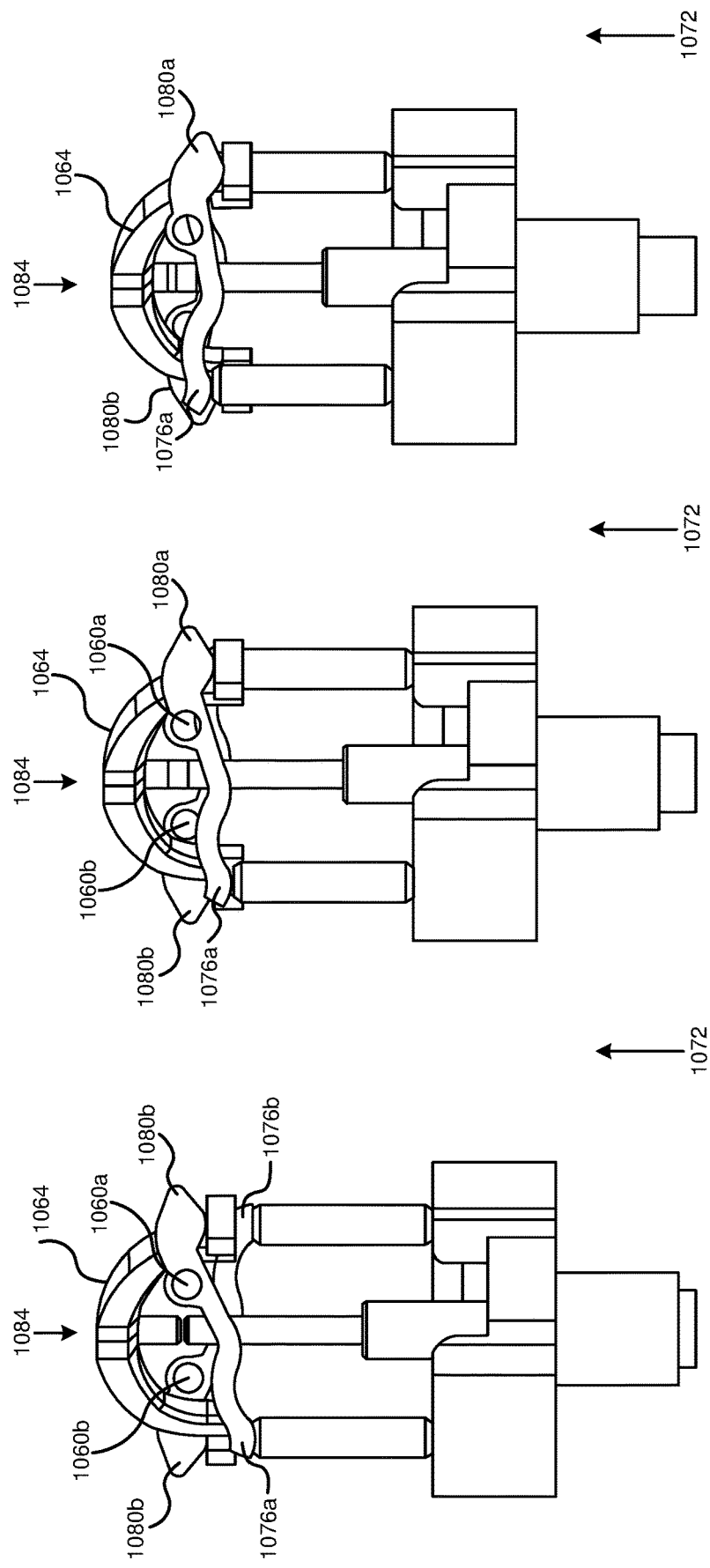

RAPID PULSE ELECTROHYDRAULIC (EH) SHOCKWAVE GENERATOR APPARATUS WITH IMPROVED ACOUSTIC WAVEFRONTS

This application is a national phase application under 35 U.S.C. § 371 of International Application No. PCT/US2018/014053 filed Jan. 17, 2018, which claims benefit of priority to U.S. Provisional Patent Application Ser. No. 62/447,191 filed Jan. 17, 2017, all of which are incorporated herein by reference in their entirety.

BACKGROUND

1. Field of the Invention

The present invention relates generally to therapeutic uses for shock waves or shockwaves. More particularly, but not by way of limitation, the present disclosure relates to an apparatus and method for generating therapeutic shock waves or shockwaves (shock waves with therapeutic uses) with improved acoustic wavefronts.

2. Description of Related Art

Acoustic shockwaves have been used for certain therapies for a number of years. "Shock wave" or "shockwave" is generally used to refer to an acoustic phenomenon (e.g., resulting from an explosion or lightning) that creates a sudden and intense change in pressure. These intense pressure changes can produce strong waves of energy that can travel through elastic media such as air, water, human soft tissue, or certain solid substances such as bone, and/or can induce an inelastic response in such elastic media. Methods for creating shock waves for therapeutic uses include: (1) electrohydraulic (EH), or spark gap; (2) electromagnetic, or EMSE; and (3) piezoelectric. Each method is based upon its own unique physical principles.

A. Devices and Systems for Shockwave Generation

U.S. patent application Ser. No. 13/574,228, published as US 2014/0276722, by one of the present inventors, discloses a device for producing shock waves at a high pulse rate using a transducer. That device includes an acoustic-wave generator configured to emit acoustic waves having at least one frequency between 1 MHz and 1000 MHz; a shockwave housing coupled to the acoustic-wave generator; and a shockwave medium disposed in the shockwave housing; where the apparatus is configured such that if the acoustic-wave generator emits acoustic waves then at least some portion of the acoustic waves will travel through the shockwave medium and form shock waves. That device can be actuated to form shock waves configured to cause particles within a patient to rupture one or more cells of the patient, and the shock waves can be directed to cells of a patient such that the shock waves cause particles to rupture one or more of the cells. This acoustic-transducer device can produce high powered shockwaves at high frequencies or pulse rates.

Additionally, U.S. patent application Ser. No. 13/798,710, published as US 2014/0257144, also by the present inventors, discloses apparatuses and methods for electrohydraulic generation of shockwaves at a rate of 10 Hz and 5 MHz comprising: a housing defining a chamber and a shockwave outlet; a liquid disposed in the chamber; a plurality of electrodes (e.g., in a spark head or module) configured to be disposed in the chamber to define one or more spark gaps; and a pulse-generation system configured to apply voltage pulses to the electrodes at a rate of between 10 Hz and 5 MHz.

Other systems for producing shockwaves can include an electrohydraulic (EH) wave generator. EH systems can generally deliver similar levels of energy as other methods, but may be configured to deliver that energy over a broader area, and therefore deliver a greater amount of shock wave energy to targeted tissue over a shorter period of time. EH systems generally incorporate an electrode (i.e., a spark plug) to initiate a shock wave. In EH systems, high energy shock waves are generated when electricity is applied to an electrode immersed in treated water contained in an enclosure. When the electrical charge is fired, a small amount of water is vaporized at the tip of the electrode and the rapid, nearly instantaneous, expansion of the vaporized water creates a shock wave that propagates outward through the liquid water. In some embodiments, the water is contained in an ellipsoid enclosure. In these embodiments, the shock wave may ricochet from the sides of the ellipsoid enclosure and converge at a focal point that coincides with the location of the area to be treated.

For example, U.S. Pat. No. 7,189,209 (the '209 Patent) describes a method of treating pathological conditions associated with bone and musculoskeletal environments and soft tissues by applying acoustic shock waves. The '209 Patent describes that shockwaves induce localized trauma and cellular apotosis therein, including micro-fractures, as well as induce osteoblastic responses such as cellular recruitment, stimulate formation of molecular bone, cartilage, tendon, fascia, and soft tissue morphogens and growth factors, and induce vascular neoangiogenesis. The '209 Patent claims several specific implementations of its method. For instance, the '209 Patent claims a method of treating a diabetic foot ulcer or a pressure sore, comprising: locating a site or suspected site of the diabetic foot ulcer or pressure sore in a human patient; generating acoustic shock waves; focusing the acoustic shock waves throughout the located site; and applying more than 500 to about 2500 acoustic shock waves per treatment to the located site to induce micro-injury and increased vascularization thereby inducing or accelerating healing. The '209 Patent discloses a frequency range of approximately 0.5-4 Hz, and application of about 300 to 2500 or about 500 to 8,000 acoustic shock waves per treatment site, which can result in a treatment duration for each treatment site and/or a "total time per treatment" for all sites that is inconveniently large. For example, the '209 Patent discloses total times per treatment for different examples ranging from 20 minutes to 3 hours.

U.S. Pat. No. 5,529,572 (the '572 Patent) includes another example of the use of electro-hydraulically generated shockwaves to produce a therapeutic effect on tissues. The '572 Patent describes a method of increasing the density and strength of bone (to treat osteoporosis), comprising subjecting said bone to substantially planar, collimated compressional shock waves having a substantially constant intensity as a function of distance from a shock wave source, and where said collimated shock waves are applied to the bone at an intensity of 50-500 atmospheres. The '572 Patent describes the application of unfocussed shock waves to produce dynamic repetitive loading of the bone to increase mean bone density, and thereby strengthen bone against fracture. As described in the '572 Patent, "the unfocussed shock waves preferably are applied over a relatively large surface of the bone to be treated, for example to cover an area of from 10 to 150 cm$^2$. The intensity of the shock waves may be from 50-500 atmospheres. Each shock wave is of duration of a few microseconds, as in a conventional lithotripter, and is preferably applied at a frequency of 1-10 shock waves per second for a period of 5-30 minutes in each treatment. The number of treatments depends on the particular patient."

U.S. patent application Ser. No. 10/415,293 (the '293 Application), which is also published as US 2004/0006288, discloses another embodiment of the use of EH-generated shockwaves to provide a therapeutic effect on tissues. The '293 Application discloses a device, system, and method for the generation of therapeutic acoustic shock waves for at least partially separating a deposit from a vascular structure. The '293 Application describes that the device can produce shockwaves at a pulse rate of about 50 to about 500 pulses per minute (i.e., 0.83 to 8.33 Hz) with a number of pulses per treatment site (in terms of per length of vascular unit being treated) from about 100 to about 5,000 per 1 $cm^2$.

B. Shockwave Rate

Prior art literature has indicated that faster pulse rates using EH systems to provide shockwaves can lead to tissue damage. For example, in one study (Delius, Jordan, & et al, 1988) [1], the effect of shock waves on normal canine kidneys was examined in groups of dogs whose kidneys were exposed to 3000 shockwaves. The groups differed only in the rate of shockwave administration which was 100 Hz and 1 Hz, respectively. Autopsy was performed 24 to 30 hours later. Macroscopically and histologically, significantly more hemorrhages occurred in kidney parenchyma if shockwaves were administered at a rate of 100 Hz (vs 1 Hz). The results showed that kidney damage is dependent on the rate of shockwave administration.

In another study (Madbouly & et al, 2005) [3], slow shockwave lithotripsy rate (SWL) was associated with a significantly higher success rate at a lower number of total shockwaves compared to the fast shockwave lithotripsy rate. In this paper, the authors discussed how human studies have also shown a decrease in the incidence of SWL induced renal injury or need for anesthesia when slower rates of test SWL were used.

In yet another study (Gillitzer & et al, 2009) [2], slowing the delivery rate from 60 to 30 shockwaves per minute also provides a dramatic protective effect on the integrity of real vasculature in a porcine model. These findings support potential strategies of reduced pulse rate frequency to improve safety and efficacy in extracorporeal shockwave lithotripsy.

Soft tissues may transition from elastic to viscous behavior for pulse rates (PRs) between 1 Hz and 10 Hz. As a result, potential damage to tissue from shockwaves at PRs between 1 Hz and 10 Hz is unpredictable when typical lithotripsy power levels are used. Perhaps as a result, the prior art teaches slower PRs and large total times per treatment (TTPT). For example, currently known EH shockwave systems generally deliver PRs of less than 10 Hz and require large total times per treatment (e.g., TTPT periods of minutes or even hours for even a single treatment site). When, as may be typical, a treatment requires repositioning of a device at multiple treatment sites, the TTPT becomes large and potentially impractical for many patients and treatment needs.

While long treatment times may be acceptable for extracorporeal shockwave lithotripsy, the use of shockwaves to provide non-lithotripsy therapeutic effects on tissue in the medical setting is less than optimal if not impractical. For example, the cost of treatment often increases with the time needed to administer a treatment (e.g., due to the labor, facilities and other resource costs allocated to the administration of the treatment). Furthermore, in addition to costs, at some point the duration of providing treatment to the patient becomes unbearable for the patient receiving, and healthcare staff providing, the treatment.

C. Parabolic Reflectors

The use of parabolic reflectors allows for the generation of planar waves that maintain peak pressure for relatively long distances. As such, planar waves have been beneficially used in deep tissue. However, parabolic reflectors can also present challenges.

First, when the tissue targeted for treatment is shallow (e.g., dermis of the skin), the peak pressure of the planar wave persists beyond the targeted tissue when using parabolic reflectors. Such waves can result in unwanted damaging effects and pain at distant tissue sites beyond the targeted treatment sites. For example, when treating dermis, a relatively planar wave will maintain enough peak pressure to effect the underlying bone structures resulting in significant pain to the patient. The formation of persistent planar acoustic wave peak pressures produced by an electrohydraulic shockwave generator using a parabolic reflector is demonstrated by examining a pressure map of the acoustic wavefront at different tissue depths. For instance, FIG. 1 depicts an acoustic wavefront pressure map from a shockwave generator using a standard parabolic reflector. As can be seen, the acoustic wave front peak pressure map illustrates the persistent nature of the peak pressure. At a 50 mm depth, the acoustic wave front peak pressure is very high and essentially unchanged from the wave front peak pressure at 30 mm depth.

Second, planar acoustic waves generated through the use of a parabolic reflector in an electrohydraulic shockwave generator are often not uniform. Specifically, parabolic reflectors in electrohydraulic shockwave generators can produce acoustic wavefronts that have both higher peak pressures (i.e., "hotspots") or lower peak pressures (i.e., "shadows"). This non-uniformity in the acoustic wavefront has at least two major sources: (1) aberrant acoustic wave reflections generated within the chamber; and (2) instability of the electrode gap location within the chamber.

The aberrant acoustic wave reflections are typically caused by hardware (i.e., electrodes, electrode bridges, etc.), ports, edges, etc. found within the chamber. These aberrant reflections will often result in the formation of acoustic wavefronts that have areas of higher peak pressures and lower peak pressures.

The instability of the electrode gap location within the chamber results from the pair of electrodes that produce a spark in the gap between the electrodes in electrohydraulic shockwave generators. This electrical spark results in a plasma bubble which collapses to produce an acoustic wave. When the electrode is placed at the appropriate focal location within the parabolic reflector, the reflected acoustic wave can result in the formation of a relatively planar wavefront. However, non-uniformity of the acoustic wavefront can occur when the focal location ("f location" or "focal point location") of the electrode gap changes. Erosion of the electrodes from the spark event leads to changes in the focal location of the spark event within the parabolic reflector. This instability of the focal location results in a non-uniformity of the outputted acoustic wave. FIGS. 2A and 2B depict graphical representations of pressure lines emanating from a parabolic reflector 202 showing the effects of varying electrode gap focal point location 200. In FIG. 2A, the focal location of the electrode gap 200 is at f=0.93, resulting in pressure lines converging at the center. This convergence of these pressure lines will result in a peak pressure hotspot 204 deeper in the tissue, resulting in excess tissue damage, treatment discomfort, and pain. Similarly, in FIG. 2B, the focal location of the electrode gap 200 is at f=0.6, resulting in pressure lines converging around the circumference of the treatment area. The convergence of the pressure lines around the circumference of the treatment area will result in a peak pressure hotspot 204 deeper in the tissue, resulting in excess tissue damage, treatment discomfort, and pain.

Therefore, while the use of parabolic reflectors may produce stable acoustic waves in select treatment situations, due to acoustic wave peak pressure persistence and acoustic wave non-uniformity (i.e., hotspots and shadows), prior art approaches are less than optimal in consistently providing uniform acoustic wavefronts. As a result, these acoustic wavefront persistence and hotspots can result in treatments that are both painful and harmful to the patient.

D. Free-Form Reflectors

Free-form reflectors are reflectors that are not purely parabolic. In the illumination field, free-form reflectors on light sources have been used to aid in providing uniform circular illumination. Due to its high degree of design freedom, free-form surfaces can simplify the structure of an optical system and satisfy complex illumination requirements. With the development of designing and machining of free-form surfaces in the past few years, this technique has been applied in many fields, such as road or searching lighting, lighting in projectors, liquid crystal display (LCD) back-lighting, automotive head-lamps, and optical lithography systems, and others (Liu & et al, 2005) [4]. Designing free-form reflectors for illumination is difficult. In recent years, a number of approaches have been described [4]. These approaches are believed to have utilized special algorithms and optimization techniques that are specific to the use of light. Examples of free-form reflectors for optical outputs can be found in: (1) U.S. Pat. No. 5,790,305; (2) U.S. Patent Application Publication No. US 2010/0208467; (3) U.S. Pat. No. 5,675,495; and (4) U.S. Pat. No. 5,204,820.

SUMMARY

This disclosure includes embodiments of apparatuses and methods for electrohydraulic generation of rapid acoustic pulses with improved acoustic wavefronts. In certain embodiments, these improved acoustic wavefronts comprise an essentially planar acoustic wavefront in the near field of the targeted treatment area that quickly disperses after a defined distance. Such a wavefront provides effective acoustic therapy in the targeted area, while limiting tissue damage and pain beyond the targeted area. In another embodiment, the improved acoustic wavefront comprises an essentially planar non-focused acoustic wavefront in the near field of the targeted treatment area that quickly disperses after a defined distance, where the acoustic wavefront is essentially uniform in terms of peak pressure. Such a wavefront provides effective acoustic therapy in the targeted areas that minimizes high concentrations of peak pressure (i.e., "hotspots") and low concentrations of peak pressure (i.e., "shadows"). These essentially uniform, non-focused, acoustic wavefronts provide for more consistent therapy over a targeted treatment area.

In certain embodiments, the apparatus for electrohydraulic generation of acoustic waves comprises: a housing defining a chamber and a shockwave outlet; a liquid disposed in the chamber; an acoustic reflector within the chamber; a plurality of electrodes (e.g., in the spark head or module) configured to be disposed in the chamber to define one or more spark gaps; and a pulse generation system configured to apply voltage pulses to the electrodes at a rate of between 10 Hz and 5 MHz. In one embodiment, the improved acoustic wavefront is achieved using an acoustic reflector in the chamber. In another embodiment, the improved acoustic wavefront is achieved using an acoustic free-form reflector in the chamber. In yet another embodiment, the an improved acoustic wavefront is achieved by providing a stable spark gap location in the chamber. In yet another embodiment, the improved acoustic wavefront is achieved through the use of an acoustic free-form reflector and a stable spark gap location in the chamber.

Some embodiments of the present apparatuses (e.g., for generating therapeutic acoustic waves) comprise: a housing defining a chamber and a shockwave outlet, the chamber configured to receive a liquid; a plurality of electrodes configured to be disposed in the chamber to define one or more spark gaps; an acoustic reflector disposed in the chamber; and a single servomotor mechanically coupled to the plurality of electrodes; where the spark gaps have a spark gap size and a spark gap location; and where the single servomotor is configured to adjust each of the electrodes to maintain a consistent spark gap size and spark gap location. In some embodiments, the acoustic reflector is a free-form acoustic reflector. In some embodiments, the plurality of electrodes comprises a first electrode and a second electrode; and the single servomotor is mechanically coupled to the first electrode and the second electrode. Some embodiments further comprise: a plurality of pivot arms mechanically coupled to the second electrode. In some embodiments, the plurality of pivot arms are configured to advance the second electrode towards the first electrode when the single servomotor is actuated. Some embodiments further comprise: a controller configured to signal the single servomotor via a closed loop control to move the plurality of electrodes and maintain the spark gap at a consistent length. In some embodiments, the controller is further configured to signal the single servomotor via a closed loop control by: measuring pulse time of the electrical discharge of the plurality of electrodes at an identified charge voltage; and signaling the single servomotor to move based on the measured pulse time thereby maintaining the spark gap at a consistent length. Some embodiments further comprise: a pulse-generation system configured to be coupled to the plurality of electrodes such that: (i) the housing is movable relative to the pulse-generation system, and (ii) the pulse-generation system is in electrical communication with the plurality of electrodes.

Some embodiments of the present apparatuses (e.g., for generating therapeutic acoustic waves) comprise: a housing defining a chamber and a shockwave outlet; a liquid disposed in the chamber; a housing defining a chamber and a shockwave outlet, the chamber configured to receive a liquid; a plurality of electrodes configured to be disposed in the chamber to define one or more spark gaps; and a free-form acoustic reflector disposed in the chamber; where the spark gaps have a spark gap size and a spark gap location. In some embodiments, the acoustic reflector is unitary with the housing.

Some embodiments of the present methods (e.g., for designing a free-form acoustic reflector, comprise the steps of: defining an origin of an acoustic pulse, a target treatment area of a patient, and a safety depth; iterating reflector shape until reflector shape capable of effectuating an energy distribution consistent with the designated target treatment are and safety depth is achieved; approximating energy density based on a final reflector shape; and verifying the final reflector shape. In some embodiments, the step of defining an origin of an acoustic pulse further comprises defining a location where a plurality electrodes are located in an electrohydraulic acoustic wave generator. In some embodiments, the step of defining a target treatment area of a patient further comprises designating a tissue depth at which to deliver uniform pressure density. In some embodiments, the step of defining a safety depth further comprises determining a depth in the patient's tissue at which the non-focused acoustic waves are dissipated by fifty (50) percent. In some embodiments, the step of iterating reflector shape further comprises using spline interpolation. In some embodiments, the step of approximating energy density further comprises performing ray tracing. In some embodiments, the step of verifying the final reflector shape further comprises using a finite element method (FEM) simulation.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent. In the disclosed embodiments, the term "adjacent" is generally defined located in the same discrete chamber, housing, or module.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus) that is configured in a certain way is configured in at least that way, but it can also be configured in other ways than those specifically described.

Any embodiment of any of the present systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 12A-12C depict three views illustrating the function of the components of FIG. 11.

DESCRIPTION OF ILLUSTRATIVE EMBODIMENTS

Figure 1:
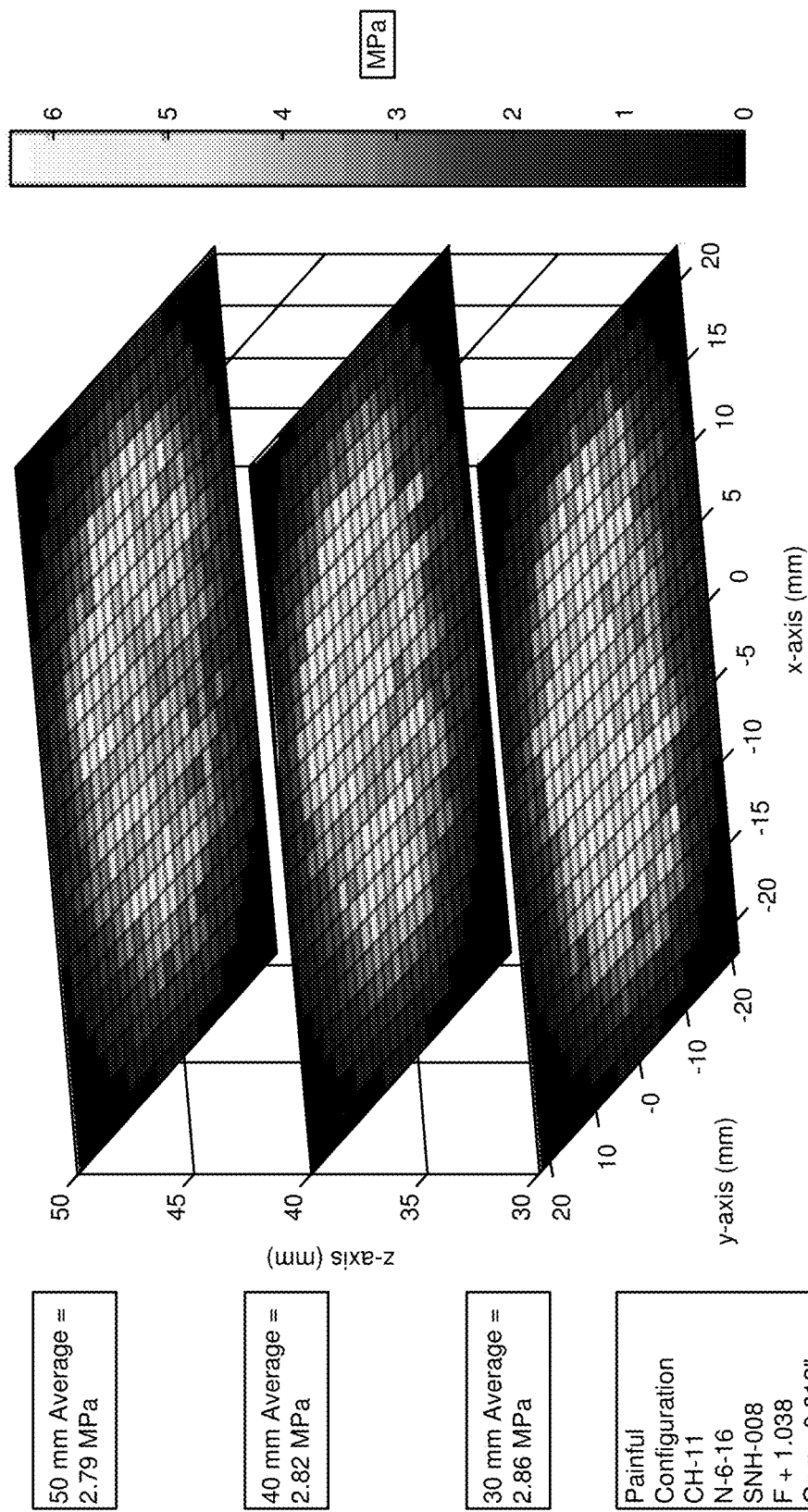
FIG. 1 depicts an acoustic wavefront pressure map from prior art shockwave generators using a standard parabolic reflector.
Figure 2A:
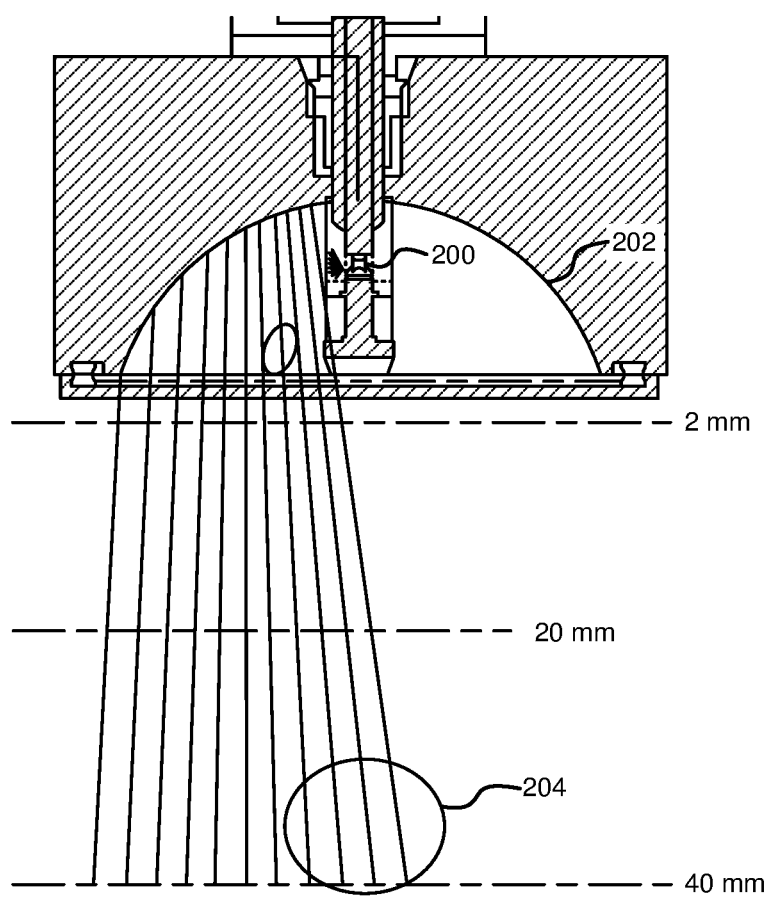
FIGS. 2A and 2B depict graphical representations of pressure lines emanating from a parabolic reflector.
Figure 2B:
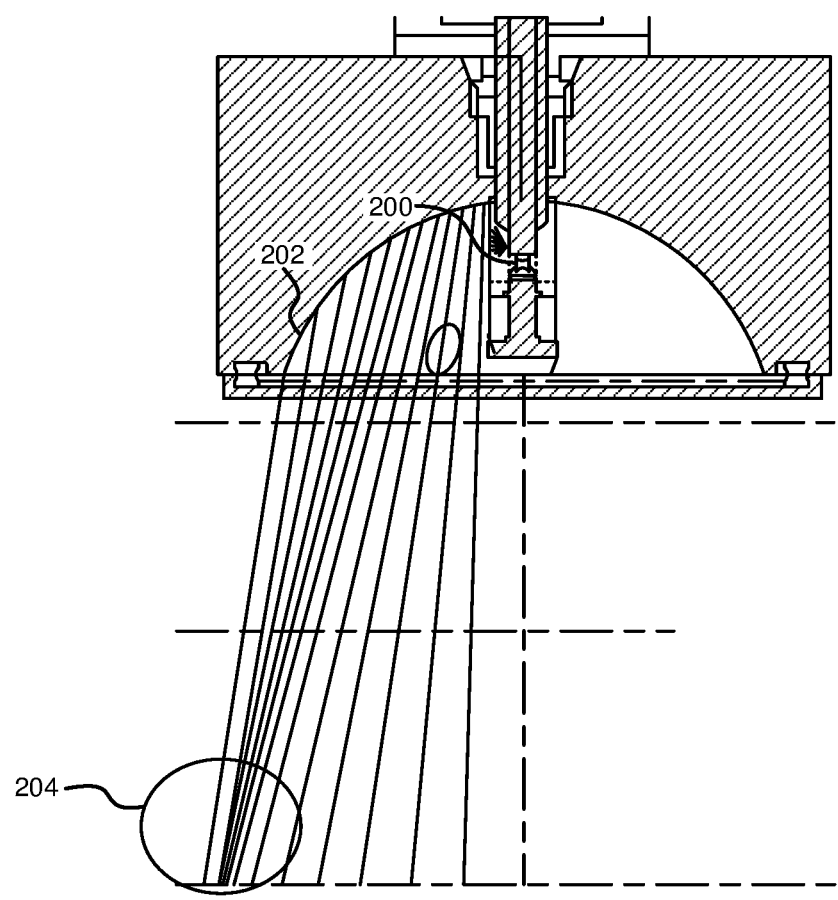

Certain embodiments of the present systems and apparatuses are configured to generate high-frequency shock waves having improved acoustic wavefronts. In some embodiments, the generated EH acoustic pulses can be used in medical and/or aesthetic therapeutic applications (e.g., when directed at and/or delivered to target tissue of a patient). Examples of medical and/or aesthetic therapeutic applications in which the present systems can be used are disclosed in: (1) U.S. patent application Ser. No. 13/574,228, published as US 2013/0046207; (2) U.S. patent application Ser. No. 13/547,995, published as, published as US 2013/0018287; and (3) U.S. patent application Ser. No. 13/798,710, published as US 2014/0257144, each of which are incorporated here in their entireties.

In one embodiment, the apparatus for electrohydraulic generation of shockwaves comprises: a housing defining a chamber and a shockwave outlet; a liquid disposed in the chamber; a plurality of electrodes (e.g., in the spark head or module) configured to be disposed in the chamber to define one or more spark gaps; and a pulse generation system configured to apply voltage pulses to the electrodes at a rate of between 10 Hz and 5 MHz. The rate of voltage pulses may be at rates of 25 Hz, 50 Hz, 75 Hz, 100 Hz, 150 Hz, 200 Hz, 250 Hz, 300 Hz, 400 Hz, 500 Hz, 600 Hz, 700 Hz, 800 Hz, 900 Hz, 1 KHz, 5 KHz, 10 KHz, 25 KHz, 50 KHz, 100 KHz, 200 KHz, 300 KHz, 400 KHz, 500 KHz, 600 KHz, 700 KHz, 800 KHz, 900 KHz, 1 MHz, 2 MHz, 3 MHz, and 4 MHz, as illustrative, non-limiting examples.

In some embodiments, the pulse generation system is configured to produce a series of acoustic shockwaves with an improved acoustic wavefront. The improved acoustic wavefront includes an essentially planar acoustic wavefront in the near field of the targeted treatment area that quickly disperses after a defined distance. Such a wavefront provides effective acoustic therapy in a targeted treatment area, but limits tissue damage and pain beyond that targeted area. In some embodiments, the improved acoustic wavefront includes an essentially planar non-focused acoustic wavefront in the near field of the targeted treatment area that quickly disperses after a defined distance where the acoustic wavefront is essentially uniform in terms of peak pressure. Such wavefronts allow for effective acoustic therapy in the targeted areas that minimizes high concentrations of peak pressure (i.e., "hotspots") and low concentrations of peak pressure (i.e., "shadows"). Having an essentially uniform, non-focused, acoustic wavefront provides for more-consistent therapy over a targeted treatment area.

In certain embodiments, the improved acoustic waveform (e.g., acoustic wavefront) is achieved using an acoustic reflector in the chamber. More specifically, certain embodiments use a free-form acoustic reflector to achieve the desired wavefront. In still further embodiments, the improved acoustic wavefront is achieved by providing a stable spark gap location in the chamber. The stabilized acoustic wavefront is achieved by maintaining the spark gap, formed from the plurality of electrodes, at a constant focal location within the chamber. In one embodiment, the plurality of electrodes is automatically adjusted via a focal point stabilization unit comprising a single servomotor used to maintained the spark gap at a constant focal location within the chamber. Certain embodiments of the disclosed apparatus comprises both the free-form acoustic reflector and a focal point stabilization unit.

A. Free-Form Reflectors

While free-form reflectors have been used for illumination purposes, using free-form reflectors for acoustic output is both difficult and impractical. For example, light waves are significantly smaller than acoustic waves such that the current approaches for designing free-form reflectors for light, would be even more challenging when used for longer wave acoustical output. Additionally, unlike a light source, such as a filament lamp or LED, acoustic sources are typically large (e.g., not necessarily "point sources") making the design of free-form non-planar acoustic reflectors even more difficult.

Current approaches to electrohydraulic generation of acoustic waves using a parabolic reflector are, in some instances, suboptimal. For example, parabolic reflectors may not mitigate for the acoustic wave non-uniformity, thereby resulting in hotspots and shadows. As discussed above, two primary sources of acoustic wave non-uniformity are: (1) aberrant acoustic wave reflections generated within the chamber; and (2) changing focal location ("f location") of the electrode gap.

The aberrant reflections are typically caused by the hardware (i.e., electrodes, electrode bridges, etc.), ports, edges, etc., found within the chamber. These aberrant acoustic wave reflections will result in the formation of acoustic wavefronts that have areas of higher peak pressures and areas of lower peak pressure. Changes in the focal location of the electrode gap may result from erosion of the electrodes caused from the spark event.

In practice, non-uniformity of the acoustic wavefronts may be problematic. Both aberrant acoustic waves and changing electrode gap location cause wavefront convergence and divergence in the treatment area that result in areas of high pressure (hotspots) and areas of low pressure (shadows). These acoustic wavefront hotspots can lead to localized high pressure areas both in and out of the target treatment area resulting in tissue damage and/or pain. Acoustic wavefront shadows cause areas of sub-therapeutic acoustic wave delivery.

As discussed above, free-form reflectors are currently used to alleviate similar problems in the fields of illumination and optics. However, as also discussed above, using free-form reflectors for acoustic output is currently both difficult and impractical due to inherent differences between light and acoustic waves. Despite these challenges, according to some embodiments of the present invention, free-form reflectors could be designed to provide improved acoustic wavefront output uniformity at a defined treatment depth while minimizing acoustic wave persistence at deeper depths. These free-form reflectors are designed to minimize acoustic hotspots while accounting for structures (i.e., electrodes, electrode bridges, water ports, chamber edges, etc.) located within the chamber.

Figure 3:
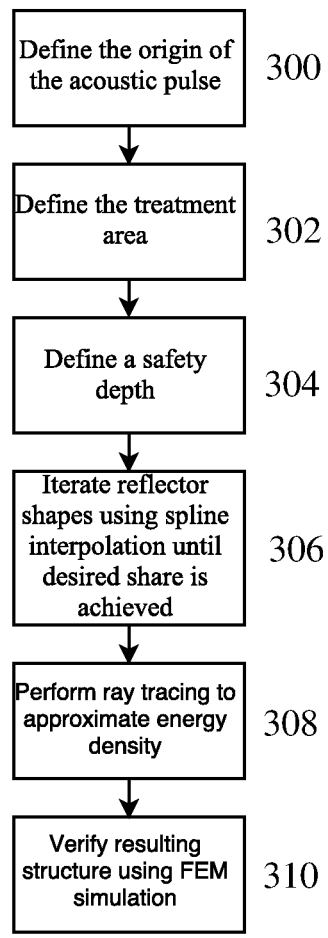
FIG. 3 depicts a flow chart for an optimization process for designing a free-form acoustic reflector having a defined acoustic wavefront.

Referring now to the drawings, FIG. 3 depicts an optimization process for designing a free-form acoustic reflector having a defined acoustic wavefront. By way of example, free-form acoustic reflectors can be designed and/or improved (e.g., optimized) using spline interpolation. The process of FIG. 3 may be computer implemented, such as by a processor coupled to a memory and configured to execute instructions stored at the memory to cause the processor to perform operations to execute the process of FIG. 3.

In the embodiment shown, the optimization process for designing a free-form acoustic reflector having a defined wavefront comprises the steps of: (1) defining the origin of the acoustic pulse 300; (2) defining the treatment area 302; (3) defining a safety depth 304; (4) iterating reflector shapes using spline interpolation until the desired shape is achieved 306; (5) performing ray tracing to approximate energy density 308; and (6) verify resulting structure using a finite element method (FEM) simulation 310.

In the embodiment shown, the origin of the acoustic pulse 300 is identified or defined. For example, the origin of the acoustic pulse is typically at or between the electrodes defining one or more spark gaps in the chamber of an electrohydraulic acoustic wave generator. In such an electrohydraulic generator, opposing electrodes are often used to generate the pulse. When the electrodes have flat faces, the origin of the acoustic pulse is typically at the edges of the electrodes rather than their center. This is often true regardless of the location of the discharge event because the acoustic waves will reflect back and forth between parallel electrode faces until they reach the edge. In other embodiments, the origin of the acoustic pulse may be at an electromagnetic acoustic wave generator, or a piezoelectric acoustic wave generator.

In the embodiment shown, a target treatment area 302 is then defined or specified, including defining the tissue depth at which uniform pressure density is desired. For example, in the context of treating tattoos, the target treatment area 400 for having uniform pressure density is less than 2 mm in depth (e.g., from the surface of a patient's skin). In other contexts, the target treatment area for having uniform pressure density may be 1 mm, 3 mm, 4 mm, 5 mm, or 1 cm in depth from the surface of the patient's skin.

Next, according to an embodiment, a safety depth 304 in the patient's tissue is defined. The safety depth is a point or depth at which the non-focused acoustic wave needs to be dissipated by a factor of two in order to minimize tissue damage and pain to the patient. This safety depth 402 is defined relative to the surface of the patient's skin based on factors specific to the target area of the patient. For example, when treating skin that overlies an area with 1 cm or more of muscle or other soft tissue between the treated skin and underlying bone tissue, the safety depth may be 5 mm. In some embodiments, safety depth 402 may be defined as a percentage of target depth 400, such as, for example, equal to or greater than any one, or between any two, of: 200%, 250%, 300%, 400%, 500%, 600%, 700%, 800%, 900%, 1000%, or more of the target depth.

In the embodiment shown, after the safety depth is identified or otherwise defined, the reflector shape is altered using spline interpolation 306 to achieve a desired (e.g., substantially uniform) energy distribution. Spline interpolation refers to a form of interpolation where the interpolant is a piecewise polynomial, called a spline. Iterating using spline interpolation in three dimensions allows for the reflector shape to be defined by solving for the "inverse problem" while compensating for the obstruction in the reflector. The specific spline interpolation requirements such as continuity of curvature and no curvature inflection points are used as input conditions.

In one example, the spline interpolation step generated a free-form reflector shape defined by the equation (using inches as the unit of measurement):

$$y=0.236x^3+0.2948x^2+0.1141x-0.3689$$

In another embodiment, the spline interpolation step generated a free-form reflector shape defined by the equation (using millimeters as the unit of measurement):

$$y=0.0004x^3+0.0116x^2+0.1141x-9.3707$$

Figure 4:
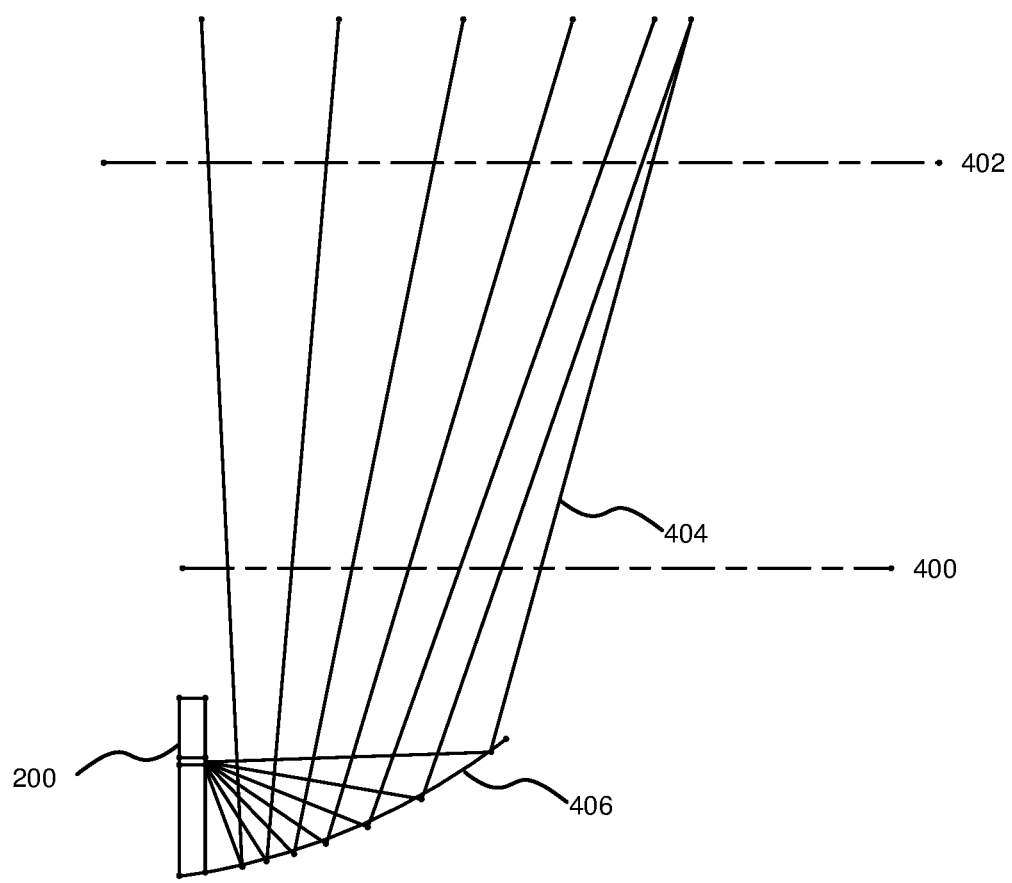
FIG. 4 depicts a graphical representation of ray tracing of acoustic waves reflected from a free-form reflector.

In the embodiment shown, after the reflector shape is defined, ray tracing 308 is used to approximate energy density that will be reflected by the reflector. Traditionally, ray tracing refers to a technique for generating an image by tracing paths of light and simulating the effects of its encounters with virtual object. Here, and as depicted in FIG. 4, ray tracing can be performed to approximate the energy density from the reflector shape defined by spline interpolation. In FIG. 4, acoustic waves (depicted as vectors 404) are generated at the electrode gap 200 and reflected off of the free-form reflector 406. These acoustic waves ideally have a uniform pressure density once they reach the target tissue depth 400 and have been dissipated by at least a factor of two by the time they reach the safety depth 402. In FIG. 4, waves 404 are approximately evenly spaced at the target tissue depth 400 indicating an approximately uniform energy distribution across the profile of the reflector. However, at the safety depth 402, the rays are farther apart (e.g., have a substantially non-uniform energy distribution), indicating a lower energy density. While a uniform pressure density at the target tissue depth is ideal, peak pressure variations of 1, 3, 5, or 10 percent over other peak pressure readings from waves generated and then by the free-form reflector may also perform the desired therapeutic function with limited or no adverse effects.

Figure 5:
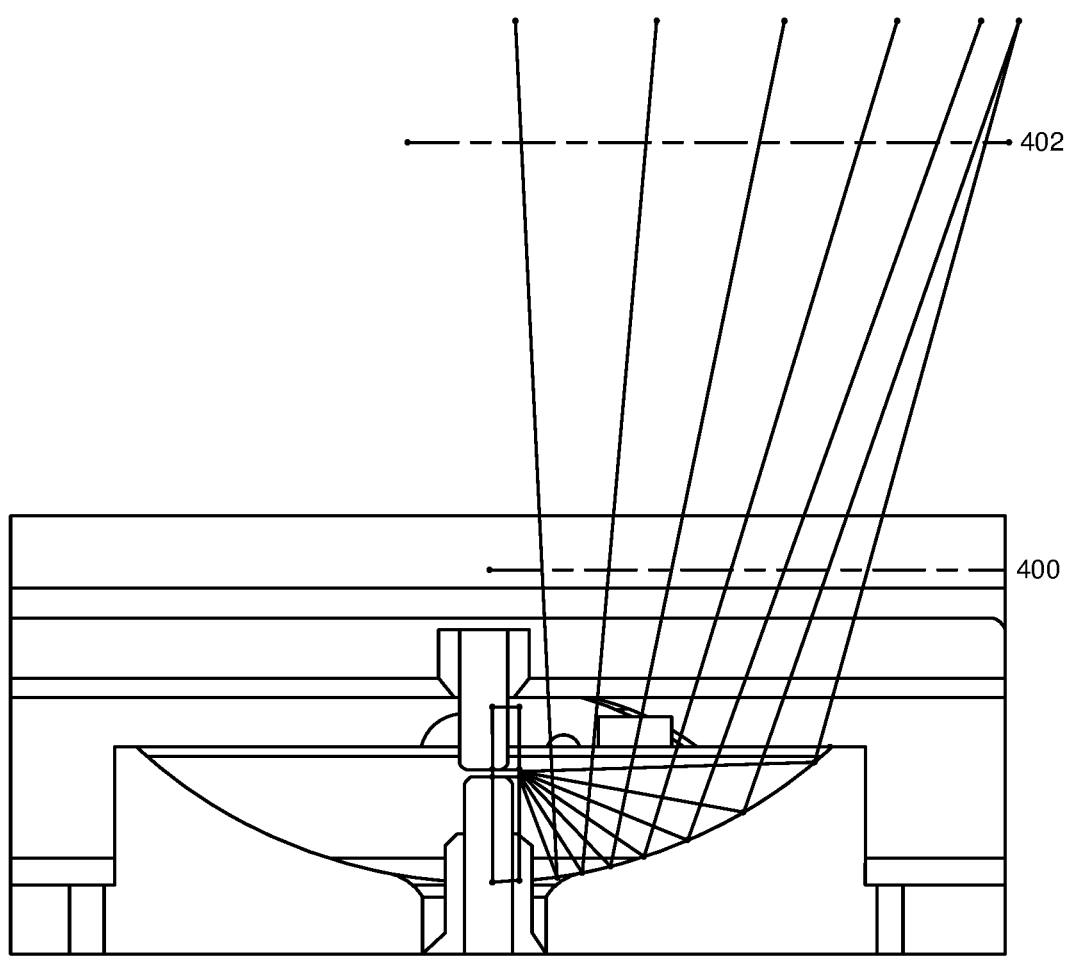
FIG. 5 depicts an FEM simulation of a free-form reflector designed using spline interpolation.

In the embodiment shown, the resulting reflector shape can be modeled 310, for example, using an acoustic finite element method (FEM) simulation. FEM refers to a numerical technique for finding approximate solutions to boundary value problems. FIG. 5 depicts an FEM simulation of a free-form reflector designed using the above described process of spline interpolation. If the FEM simulation determines the free-form acoustic reflector is viable, a physical prototype can then be made and, if desired, physically tested.

Figure 6A:
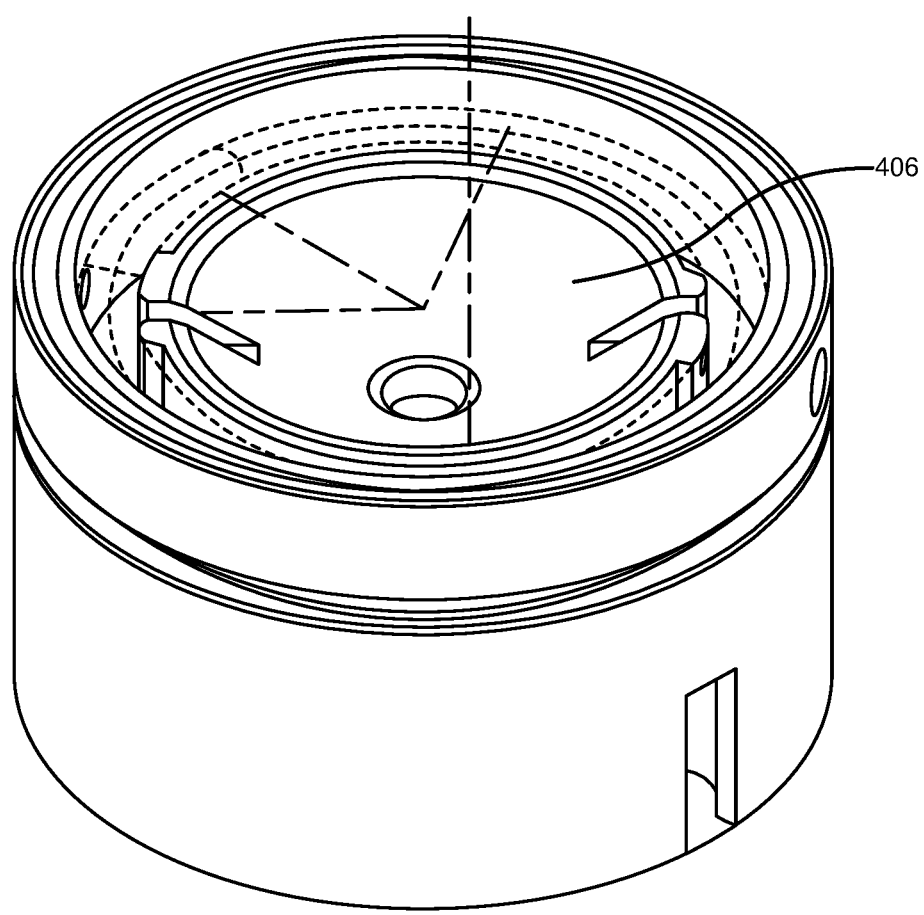
FIGS. 6A and 6B depict isometric and cross-sectional views of a sparkhead portion of an apparatus, respectively.
Figure 6B:
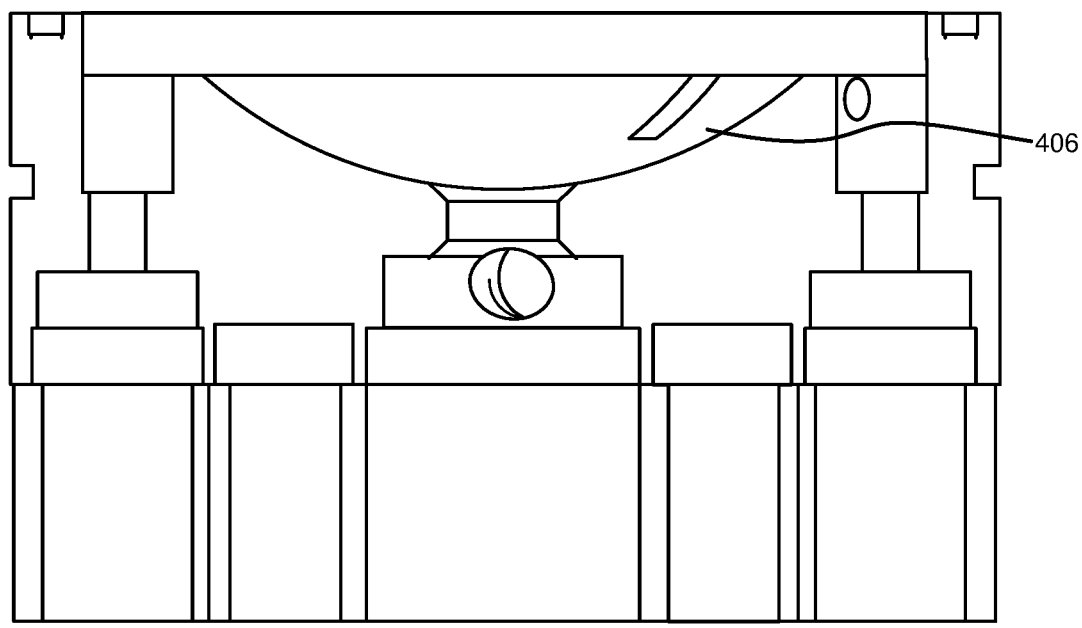

FIGS. 6A and 6B depict an embodiment of the therapeutic wave generator. FIG. 6A depicts an isometric view of a sparkhead portion of the disclosed therapeutic wave generator, comprising a free-form reflector 406. Additionally, FIG. 6B depicts a cross-section of a sparkhead portion of one embodiment of the therapeutic wave generator, comprising a free-form reflector 406.

Figure 7:
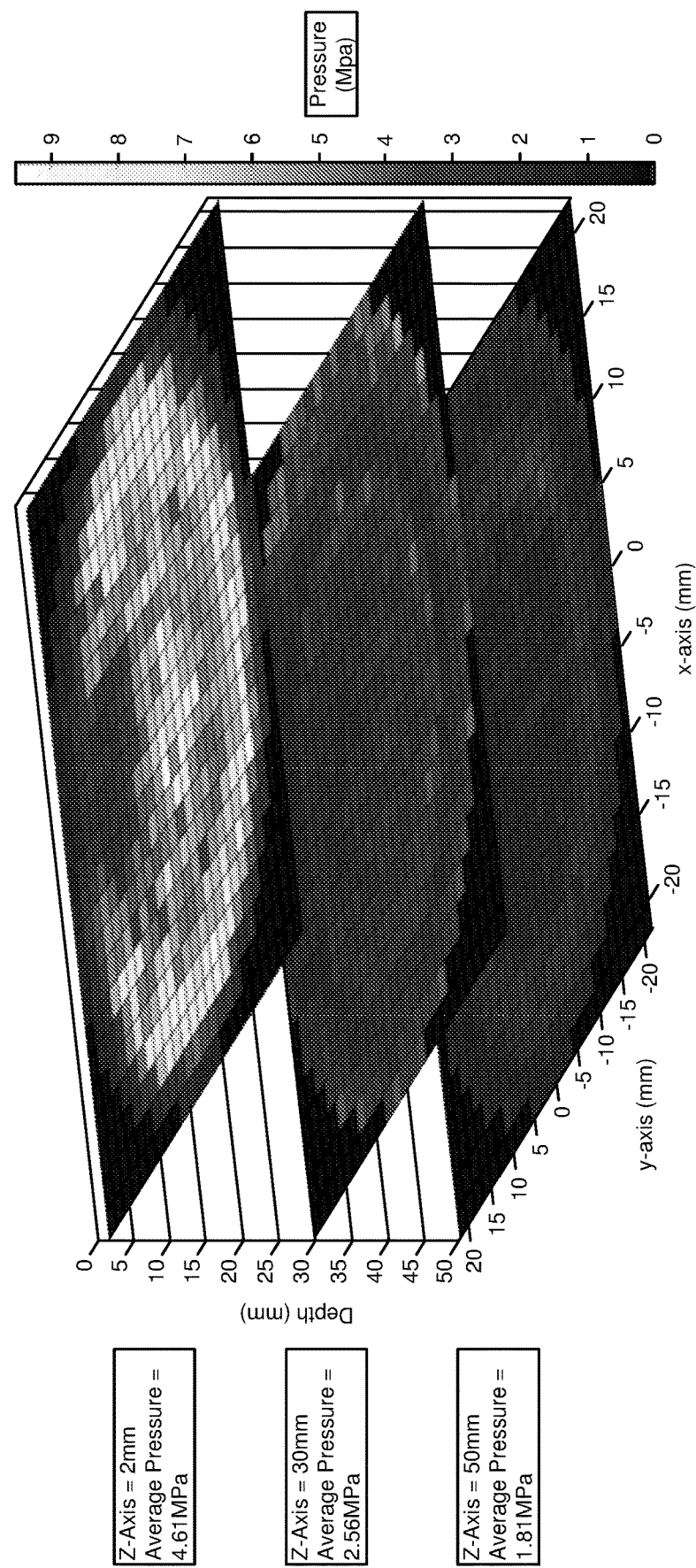
FIG. 7 is an acoustic wavefront pressure map from shockwave generators using a free-form reflector.

FIG. 7 depicts an acoustic wavefront pressure map made from a shockwave generator using a free-form reflector designed based on the general optimization process described above. The acoustic maps demonstrate that the acoustic wavefront peak pressure is limited to shallow depths (~2 mm) of the dermis, thereby demonstrating a substantial improvement over parabolic reflectors, as shown in FIG. 1, where the acoustic wavefront peak pressure is still persistent even at 50 mm in depth.

Figure 8:
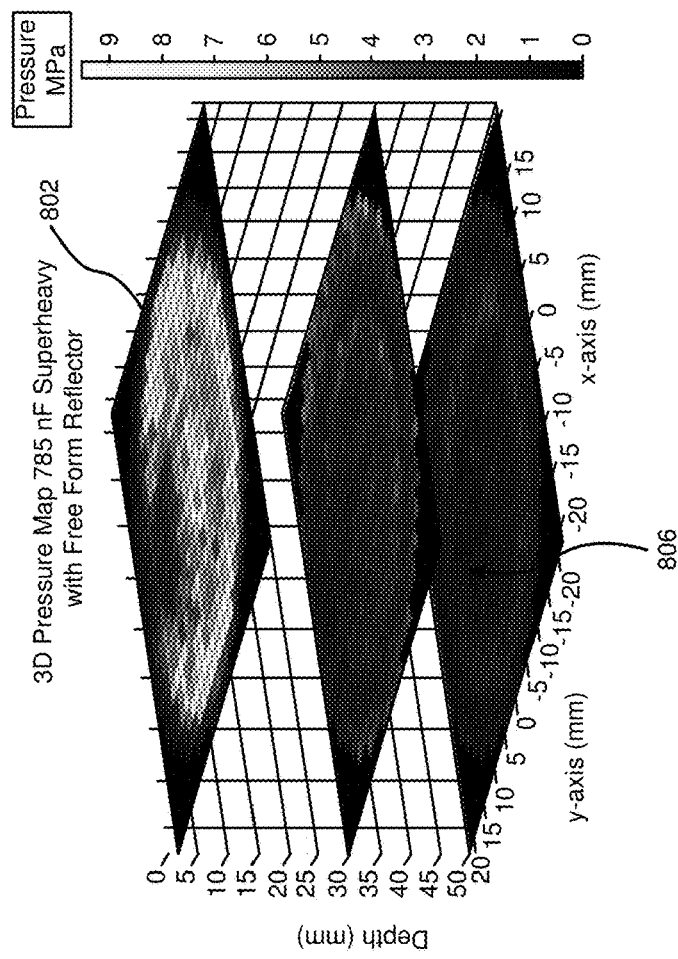
FIG. 8 is a side-by-side comparison of the acoustic wavefront pressure maps of a parabolic reflector and a free-form reflector.
Figure 8:
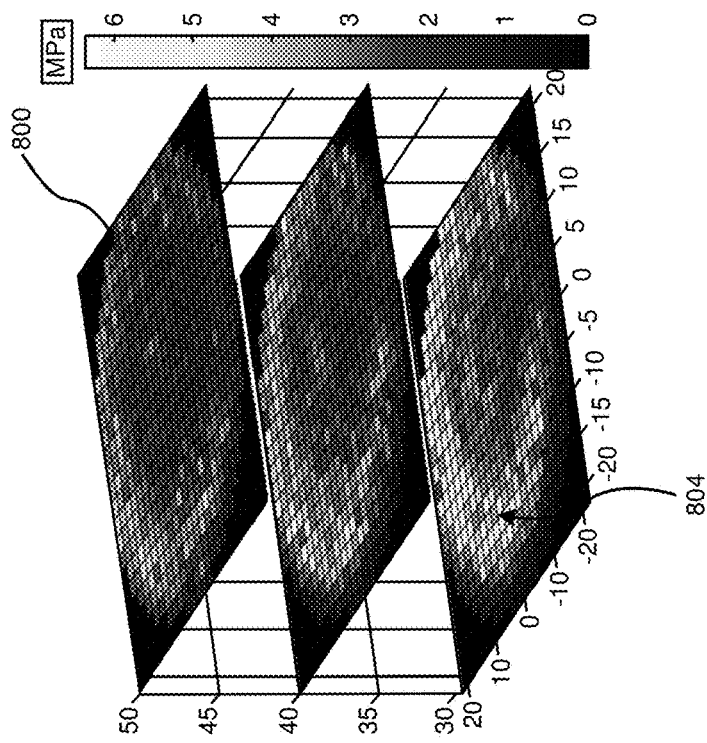

FIG. 8 depicts a comparison of the acoustic map of a parabolic reflector (800, FIG. 1) to that of a free-form reflector (802, FIG. 7). As shown in FIG. 8, the use of the free-form reflector provides a means to minimize acoustic pressure hotspots when compared to those created using the parabolic reflector. The parabolic reflector portion 800 of FIG. 8 demonstrates circumferential hotspots 804 that persist to deep tissue depths. These acoustic hotspots can result in tissue damage can result in tissue damage and treatment discomfort. Dissimilarly, the acoustic map of the free-form reflector 802 shows the effective elimination of circumferential hotspots 806 at depth accomplished by the use of a free-form reflector design. Thus, treatment using the free-form reflector provides for treatment that is less painful and with a lower potential for collateral tissue damage.

B. Focal Point Stabilization

A discussion of acoustic wavefront formation generated by an electrohydraulic generator can be found in U.S. Provisional Patent Application No. 62/365,009, filed Jul. 21, 2016 and entitled "Rapid Pulse Electrohydraulic (EH) Shockwave Generator Apparatus With Improved Electrode Life," which is incorporated by reference in its entirety.

The use of free-form acoustic reflectors to provide improved acoustic wavefronts can aid in providing effective, pain-free treatment. However, the design of such a free-form reflector may be optimized with a stable focal location of the acoustic source within the chamber. Prior art acoustic wave generators have been suboptimal at providing a stable focal location, which can result in difficulties in designing a free-form reflectors for acoustic applications.

To maintain a stable acoustic focal location within the chamber, not only does the specific electrode gap size need to be maintained, but also the specific electrode gap location within the reflector chamber should remain constant. Because electrodes erode at varying rates, maintaining a stable gap size and gap location within the chamber is difficult. To overcome this problem, each electrode must be constantly adjusted.

Manual adjustment of one or both of the electrodes is one potential solution to adjusting the acoustic focal location and electrode gap size. Such manual approaches could involve, for example, moving the electrode(s) via a screw-like mechanism. While these manual approaches may be acceptable in electrohydraulic shock wave generators that produce acoustic pulses at a very slow rate, an electrohydraulic shock wave generator that rapidly produces a large number of pulses can quickly erode electrodes and thus requires almost constant adjustment, a requirement that is difficult to meet with manual adjustment of electrodes.

Additionally, to maintain a stable gap location within the chamber, any adjustment method not only should maintain a specific gap size between the electrodes, but should also maintain a specific gap location within the housing. If the electrode size is kept stable, but the gap location within the chamber shifts, the resulting acoustic wavefront would not be stable. As a result, the adjustment of both electrodes is required in order to maintain both gap size and gap location (i.e., focal point location within the chamber). To achieve this in a commercially viable way using manual adjustment of both electrodes is difficult and impractical.

Therefore, automated electrode adjustment methods would be helpful in providing a stable electrode gap size and location within the chamber. One example of a prior automated electrode adjustment approach to maintain a specific electrode gap size and gap location within the chamber is noted in U.S. patent application Ser. No. 10/896,040 (the '040 Application), which is also published as US 2006/0036168. The '040 Application describes an electrohydraulic shock wave generating system with automatic gap adjustment where the gap-controlling unit includes two servomotors and two servomotor drivers for driving the servomotors. Two servomotors are used in the system of the '040 Application because each electrode erodes at a different rate. Thus, in order to maintain the specific gap location, each electrode needs to be adjusted a different amount in order to maintain the electrode gap size and gap location.

The use of two servomotors to maintain electrode gap location within the reflector adds costs and engineering complexity to the electrohydraulic apparatus containing the electrodes. As a result, building a low cost, commercially viable electrohydraulic shock wave generating system that includes a simple acoustic head with automated adjustable electrodes has been impractical. Building one that is disposable has been similarly impractical and commercially non-feasible.

Figure 9:
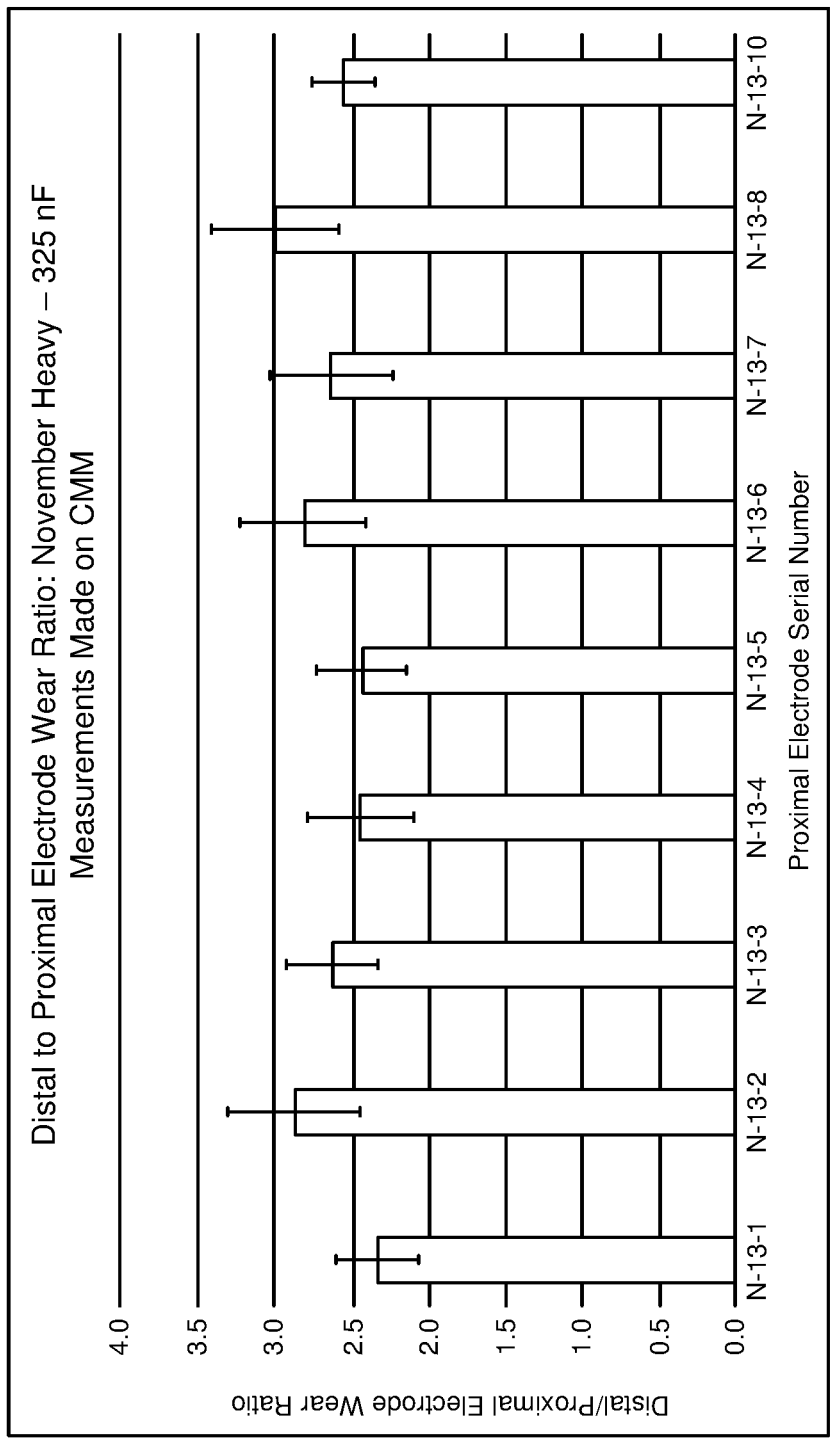
FIG. 9 is a graph providing experimental data regarding cathode and anode electrode erosion-rate ratios.

While two electrodes used in an electrohydraulic acoustic wave generator may erode at different rates, these erosion rates should be relatively similar at a defined power level and the ratio of the erosion rates should be relatively similar at a defined power level. FIG. 9 depicts experimental results of running a number of different electrohydraulic generators for a period of time at a power level of 325 nF, after which the erosion for each separate electrode was measured. The results indicate that, in all trials, both electrodes experienced erosion and both electrodes in an electrode pair experienced different rates of erosion. Additionally, the results indicate that the erosion rates for both electrodes in each electrode pair was relatively constant, as was the ratio of the erosion rates for the two electrodes. As shown in FIG. 9, the average wear ratio was 2.62.

Based on these results, adjusting both electrodes can now be accomplished using a single servomotor (and appropriate gearing) to maintain a specific gap size and focal location within the electrohydraulic generator chamber. This simplifies the design and costs for making a commercially viable electrohydraulic generator and makes it feasible to produce a simple, inexpensive, disposable electrohydraulic head that has automated adjustment electrodes.

EXAMPLE

Figure 10:
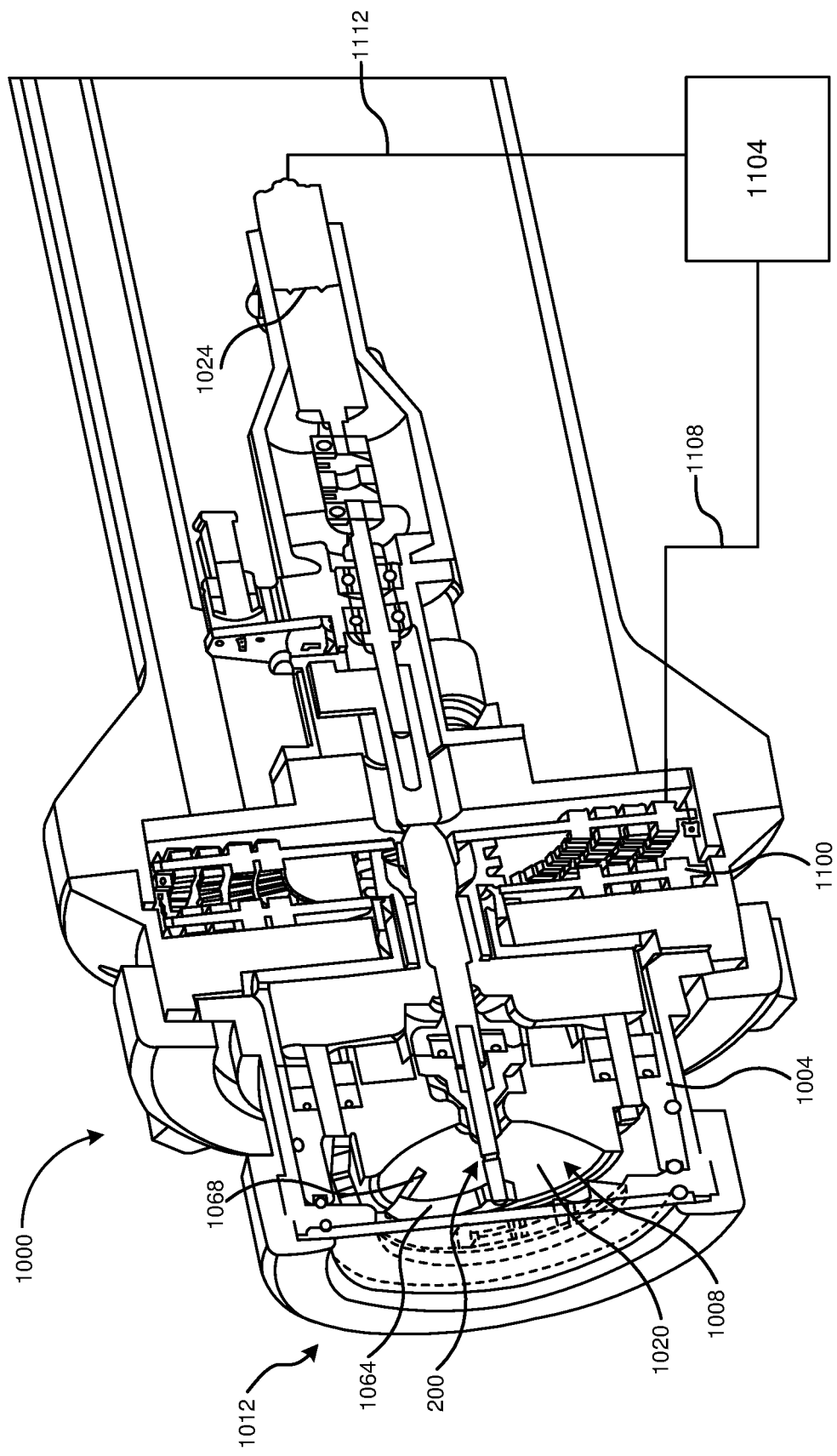
FIG. 10 depicts a cross-sectional view of one embodiment of an apparatus for electrohydraulic generation of acoustic waves that have improved acoustic wave fronts.

FIG. 10 depicts a cross-sectional drawing of one embodiment of an apparatus for electrohydraulic generation of acoustic waves that have improved acoustic wavefronts. As shown in FIG. 10, the apparatus 1000 for electrohydraulic generation of acoustic waves comprises: a housing 1004 defining a chamber 1008 and a shockwave outlet 1012; a liquid disposed in the chamber 1008; an acoustic reflector 1020 within the chamber 1008; a plurality of electrodes 1016a, 1016b (e.g., in the spark head or module) configured to be disposed in the chamber 1008 to define one or more spark gaps 200; and a pulse generation system 1006 configured to apply voltage pulses to the electrodes 1016a, 1016b at a rate of between 10 Hz and 5 MHz. In the embodiment shown, acoustic reflector 1020 is or comprises a free-form reflector, while in other embodiments, the acoustic reflector may be parabolic.

In this embodiment, a stabilized acoustic wavefront is achieved using a free-form acoustic reflector that has the spark gap, formed from a plurality of electrodes, maintained at a constant focal location from the acoustic reflector.

Figure 11:
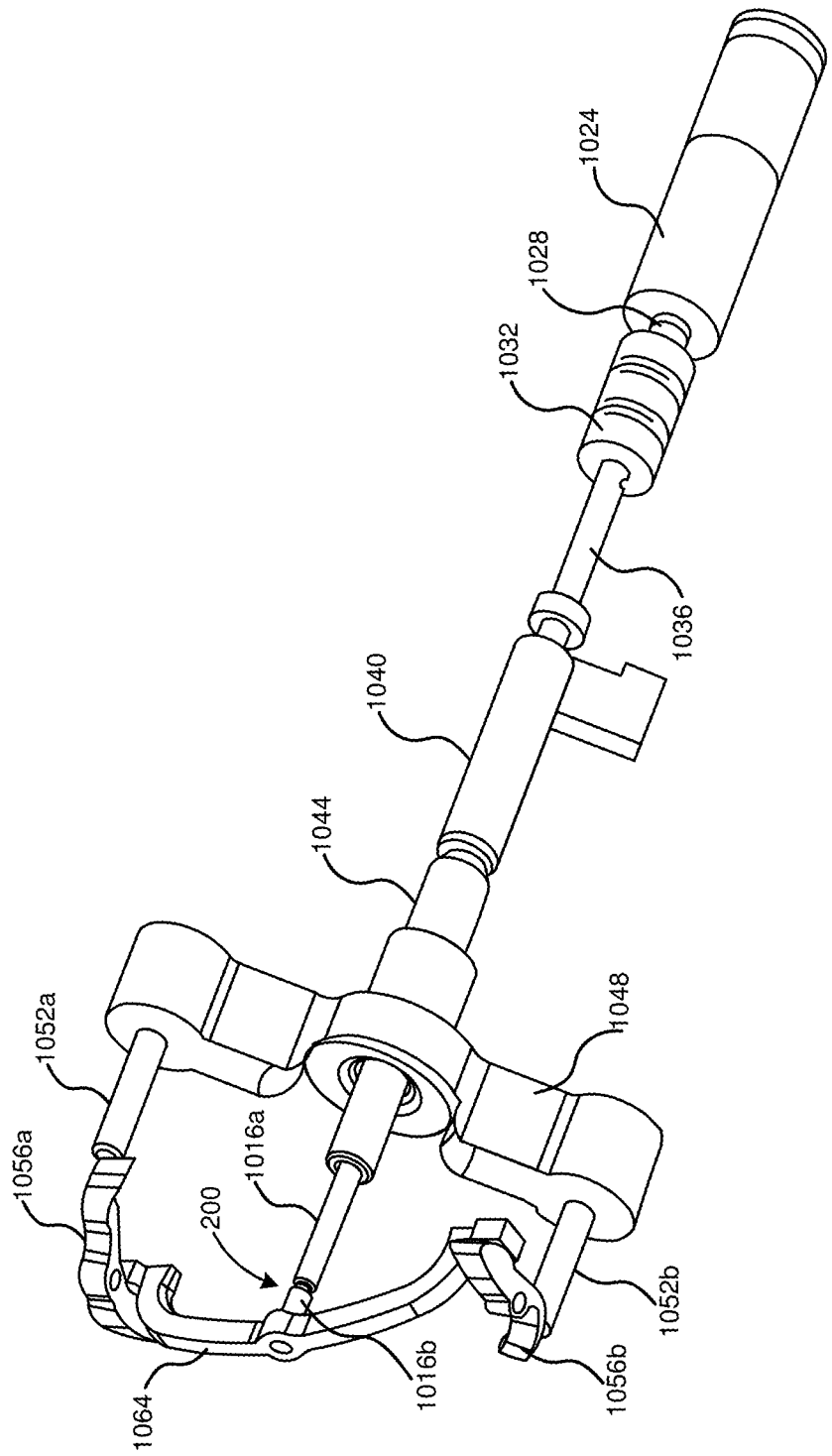
FIG. 11 depicts a perspective view of certain components the apparatus of FIG. 10.

In some of the present embodiments, a spark gap between a plurality of (e.g., two) electrodes is automatically adjusted using a single servomotor to maintain the spark gap at a substantially constant focal location from the reflector. For example, in the embodiment shown in FIGS. 10-12, a single servomotor is used to move a pair of electrodes in such a way that the size and location of the electrode gap are maintained substantially constant. FIG. 10 depicts a perspective, cross-sectional view of a portion of an apparatus or probe 1000 that can be connected to a power source to electrohydraulically generate shock waves; FIG. 11 depicts a perspective view of the components of probe 1000 that permit adjustment of the electrodes to maintain the size and location of the spark gap; and FIGS. 12A-12C depict the components of FIG. 11 at three different positions illustrating the maintenance of the spark gap.

In the embodiment shown, apparatus 1000 includes a housing 1004 defining a chamber 1008 and a shockwave outlet 1012, and the chamber configured to receive (e.g., be filled with) a liquid such as water. As shown, apparatus 1000 also comprises a plurality of electrodes 1016a, 1016b and an acoustic reflector 1020 disposed in (e.g., defining part of the boundary of) the chamber 1008. As shown, electrodes 1016 are configured to be disposed in chamber 1008 to define one or more spark gaps 200 having a size (i.e., distance between end surfaces of the electrodes 1016a and 1016b) and a location. In the embodiment shown, reflector 1020 is a free-form reflector.

In the embodiment shown, apparatus 1000 comprises a single servomotor 1024 mechanically coupled to the plurality of electrodes 1016a, 1016b, and is configured to adjust each of the electrodes, to maintain the size and location of spark gap 200 substantially constant. In this embodiment, servomotor 1024 has an output shaft 1028 with a chuck or coupler 1032 that couples shaft 1028 to a lead screw 1036 that is coupled via threads to a shuttle or pusher 1040 such that rotation of lead screw 1036 results in longitudinal movement of pusher 1040. A primary electrode 1016a is coupled to (e.g., configured to be pushed by) pusher 1040; for example, in the embodiment shown, a primary electrode carrier 1044 extends/carries primary electrode 1016a and extends to pusher 1040 as shown. In other embodiments, electrode carrier 1044 and primary electrode 116a may be unitary (e.g., formed of a single piece of material). As shown, a spreader bar 1048 is coupled in fixed relation to primary electrode carrier 1044, and spreader bar 1048 carries two pusher rods 1052a, 1052b extending from spreader bar 1048 and configured to interact with two respective pivot arms 1056a, 1056b. As shown, pivot arms 1056a, 1056b are each pivotally coupled (e.g., via pins) to housing 1004 at respective pivot points 1060a, 1060b such that, as pusher rods 1052a, 1052b advance in direction 1084.

In this embodiment, secondary electrode 1016b is coupled to (and carried by) a secondary electrode carrier 1064. As shown, secondary electrode carrier 1064 has an inverted U-shape and is slidably coupled to housing 1004 (e.g., slidably disposed in a slot or track 1068). Additionally, a spring or other biasing member (not shown) biases secondary carrier 1064 and secondary electrode 1016b in a direction 1072 away from primary electrode 1016a.

In this configuration, and as shown in the progression in FIGS. 12A-12C, when motor 1024 is actuated, shaft 1028 rotates lead screw 1036 which, in turn, longitudinally advances shuttle 1040, primary electrode carrier 1044, primary electrode 1016a, spreader bar 1048, and pusher rods 1052a, 1052b in direction 1072. As these components advance, pusher rods 1052a, 1052b contact, and impart a force in direction 1072 on, respective first ends 1076a, 1076b of pivot arms 1056a, 1056b. The upward (in the orientation depicted in FIGS. 12A-12C) force on first ends 1076a, 1076b causes pivot arms 1056a, 1056b to pivot around their respective pivot points 1060a, 1060b, and moves the pivot arms' respective second ends 1080a, 1080b downward to impart a force in direction 1084 on secondary electrode carrier 1064 to move secondary electrode 1016b toward primary electrode 1016a. In this way, as the electrodes erode during use, a single servomotor can simultaneously move primary electrode 1016a upward and secondary electrode downward 1016b downward to maintain both the size and position of the electrode gap between the ends of the electrodes 1016a, 1016b.

In the embodiment shown, housing 1004 also houses a circuit board assembly 1100 which, as described in U.S. Provisional Patent Application No. 62/365,009 (incorporated above), is configured to receive voltage from an external pulse generation system 1006 and deliver voltage pulses to and/or through primary electrode 1016 a to generate sparks between the electrodes and thereby shockwaves. In the embodiment shown, a controller 1104 is coupled in electrical communication with one or both of the electrodes (e.g., via circuit board assembly 1100 as shown or, in other embodiments, directly) via connection 1108, and with motor 1024 via connection 1112, such that the controller can control motor 1024 based on measurements of sparks between the electrodes. For example, to maintain a constant electrode gap size and location, a closed loop control is used to signal motor 1124 to feed the electrode forward and maintain gap 200 at the desired size. This closed loop control may be performed by measuring the pulse time of the electrical discharge at a particular charge voltage. The characteristics of the electrical discharge correlate very closely to the electrode gap 200 distance. By measuring these characteristics, closed loop control can be performed by signaling the motor 1024 to move and thereby maintain the gap between the electrodes and, in turn, maintain the desired electrical characteristics of the discharge. In some embodiments, controller 1104 is a component of the spark-generation system (e.g., the functionality described for controller 1104 is incorporated into the instructions or code executed by the primary discharge controller of the spark-generation system). For example, motor 1024 can be driven directly from the main discharge controller of the spark-generation system by applying electrical pulses directly to the motor windings by means of extended leads. In other embodiments, controller 1104 is a second and/or independent controller with a separate adjustment function. For example, controller 1104 can be mounted in the housing and can receive analog or digital signals (e.g., electrical, optical, and/or the like) from a or the primary controller of the spark-generation system.

The electrohydraulic shockwave generators disclosed herein produce acoustic wavefronts having an improved acoustic wavefront uniformity. According to one embodiment, this improved acoustic wavefront uniformity is achieved through the use of an electrohydraulic generator using a free-form acoustic reflector and a single servomotor electrode adjustment system. As a result, the electrohydraulic apparatuses disclosed here provide safer, more comfortable, acoustic wave therapy when used to treat a patient.

The above specification and examples provide a description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

REFERENCES

[1] Delius, M., Jordan, M., & et al. (1988). Biological effects of shock waves: Kidney Haemorrhage by shock waves in dogs—administration rate dependence. *Ultrasound in Med. & Biol.*, 14(8), 689-694.
[2] Gillitzer, R., & et al. (2009). Low-frequency extracorporeal shock wave lithotripsy improves renal pelvic stone disintegration in a pig model. *BJU Int*, 176, 1284-1288.
[3] Madbouly, K., & et al. (2005). Slow versus fast shock wave lithotripsy rate for urolithiasis: a prospective randomized study. *The Journal of urology*, 173, 127-130.
[4] Liu, Peng, & et al. (2012). Optimized design of LED freeform lens for uniform circular illumination. *Journal of Zhejiang University—Science C (Computer & Electron*, 2012 13(12), 929-936.

The invention claimed is:

1. An apparatus for generating therapeutic acoustic waves, comprising:
a housing defining a chamber and a shockwave outlet, the chamber configured to receive a liquid;
a plurality of electrodes configured to be disposed in the chamber to define one or more spark gaps, the plurality of electrodes comprising a first electrode and a second electrode defining a first spark gap;
a reflector defining a focal location; and
a single servomotor comprising an output shaft that is mechanically coupled to a primary electrode carrier and a secondary electrode carrier, the primary electrode carrier being coupled to the first electrode and the secondary electrode carrier being coupled to the second electrode, the mechanical coupling of the output shaft to the primary electrode carrier and the secondary electrode carrier enabling movement of the output shaft in a first direction to cause simultaneous linear translation of the primary electrode carrier and the secondary electrode carrier to maintain a size of the first spark gap
and to maintain a position of the first spark gap at the focal location of the reflector.

2. The apparatus of claim 1, wherein the reflector comprises a free-form acoustic reflector disposed in the chamber, wherein the free-form acoustic reflector is non-parabolic, and wherein the free-form acoustic reflector is configured to provide a uniform pressure density of acoustic waves at a target depth.

3. The apparatus of claim 1, wherein the secondary electrode carrier comprises a pivot arm.

4. The apparatus of claim 3, where the pivot arm is configured to advance the second electrode towards the first electrode responsive to the single servomotor being actuated to advance the output shaft in the first direction and responsive to the first electrode being advanced.

5. The apparatus of claim 1, further comprising a controller configured to signal the single servomotor via a closed loop control to operate to move the first electrode and the second electrode and maintain the first spark gap at a consistent length.

6. The apparatus of claim 5, where the controller is further configured to signal the single servomotor via the closed loop control, and where, to signal the single servomotor, the controller is configured to:
measure a pulse time of an electrical discharge of the first electrode and the second electrode at an identified charge voltage; and
signal the single servomotor to move the output shaft a first distance in the first direction based on the measured pulse time thereby maintaining the first spark gap at the consistent length.

7. The apparatus of claim 5, wherein the single servomotor maintaining the consistent length of the first spark gap and consistent position of the first spark gap at the focal location relative to the reflector allows for generation of therapeutic waves having a uniform pressure.

8. The apparatus of claim 1, further comprising:
a pulse-generation system configured to be coupled to the plurality of electrodes such that: (i) the housing is movable relative to the pulse-generation system, and (ii) the pulse-generation system is in electrical communication with the plurality of electrodes.

9. The apparatus of claim 1, wherein the therapeutic acoustic waves are substantially planar.

10. An apparatus for generating therapeutic acoustic waves, comprising:
a housing defining a chamber and a shockwave outlet, the chamber configured to receive a liquid;
a plurality of electrodes configured to be disposed in the chamber, the plurality of electrodes comprising a first electrode and a second electrode, the first electrode and the second electrode define a spark gap;
a free-form acoustic reflector disposed in the chamber, wherein the free-form acoustic reflector is non-parabolic and defines a focal location;
a servomotor comprising an output shaft that is mechanically coupled to a primary electrode carrier and a secondary electrode carrier, the primary electrode carrier being coupled to the first electrode and the secondary electrode carrier being coupled to the second electrode, the mechanical coupling of the output shaft to the primary electrode carrier and the secondary electrode carrier enabling movement of the output shaft in a first direction to cause simultaneous linear translation of the primary electrode carrier and the secondary electrode carrier to maintain a size of the spark gap; and
a controller configured to actuate the servomotor to maintain the size of the spark gap and to keep the spark gap positioned at the focal location of the reflector based on erosion of the first electrode and the second electrode.

11. The apparatus of claim 10, where the free-form acoustic reflector is unitary with the housing.

12. The apparatus of claim 10, where the servomotor is a single servomotor.

13. The apparatus of claim 12, where the single servomotor is configured to advance the output shaft in the first direction to advance the second electrode toward the first electrode responsive to the first electrode being advanced.

14. The apparatus of claim 12, where the controller is configured to:
measure a pulse time of an electrical discharge of the first electrode and the second electrode at an identified charge voltage; and
actuate the single servomotor to move the output shaft a first distance in the first direction based on the measured pulse time thereby maintaining the spark gap at a consistent length.

15. The apparatus of claim 12, further comprising:
a pulse-generation system configured to be coupled to the plurality of electrodes such that: (i) the housing is movable relative to the pulse-generation system, and (ii) the pulse-generation system is in electrical communication with the plurality of electrodes.

16. The apparatus of claim 10, wherein the actuation of the servomotor to maintain the size and the focal location of the spark gap allows for generation of therapeutic waves having a uniform pressure.

17. The apparatus of claim 10, wherein the therapeutic acoustic waves are substantially planar.

18. A method for generating acoustic shockwaves, comprising generating a first set of one or more shockwaves using the apparatus of claim 1 at a first time and wherein the apparatus of claim 1 further comprises the liquid.

19. The method of claim 18, further comprising propagating the one or more shockwaves to a target treatment area to treat a tattoo.

20. The method of claim 18, further comprising adjusting, via the single servomotor, each electrode of the plurality of electrodes at a second time.

21. The method of claim 20, further comprising generating a second set of one or more shockwaves using the apparatus at a third time.

22. The method of claim 21, further comprising:
adjusting, via the single servomotor, each electrode of the plurality of electrodes at a fourth time; and
generating a third set of one or more shockwaves using the apparatus at a fifth time.

23. The method of claim 22, wherein, due to erosion of the plurality of electrodes, the size of the first spark gap and the position of the first spark gap at the focal location at the first time is equal to the size of the first spark gap and the position of the first spark gap at the focal location at the third and fifth times.

* * * * *